(12) United States Patent
Inoue et al.

(10) Patent No.: US 9,862,291 B2
(45) Date of Patent: Jan. 9, 2018

(54) SEAT SLIDE DEVICE

(71) Applicant: Delta Tooling Co., Ltd., Hiroshima-shi (JP)

(72) Inventors: Katsuhiro Inoue, Hiroshima (JP);
Etsunori Fujita, Higashihiroshima (JP);
Yumi Ogura, Higashihiroshima (JP);
Seiji Kawasaki, Higashihiroshima (JP);
Seiya Yoshida, Hatsukaichi (JP);
Toshiya Kushiyama, Hiroshima (JP);
Masahiro Kuromoto, Aki-gun (JP);
Eiji Sugimoto, Higashihiroshima (JP);
Minoru Nakamura, Hiroshima (JP);
Ryuji Kuwano, Hiroshima (JP)

(73) Assignee: Delta Tooling Co., Ltd., Hiroshima-shi (JP)

( * ) Notice: Subject to any disclaimer, the term of this patent is extended or adjusted under 35 U.S.C. 154(b) by 142 days.

(21) Appl. No.: 14/413,313

(22) PCT Filed: Aug. 9, 2013

(86) PCT No.: PCT/JP2013/071729
§ 371 (c)(1),
(2) Date: Jan. 7, 2015

(87) PCT Pub. No.: WO2014/027628
PCT Pub. Date: Feb. 20, 2014

(65) Prior Publication Data
US 2015/0191106 A1 Jul. 9, 2015

(30) Foreign Application Priority Data

Aug. 14, 2012 (JP) .................................. 2012-179977
Dec. 14, 2012 (JP) .................................. 2012-274138
Jun. 25, 2013 (JP) .................................. 2013-132917

(51) Int. Cl.
*B60N 2/07* (2006.01)
*B60N 2/08* (2006.01)

(52) U.S. Cl.
CPC ......... *B60N 2/0715* (2013.01); *B60N 2/0705* (2013.01); *B60N 2/0818* (2013.01); *B60N 2/0843* (2013.01); *B60N 2/0887* (2013.01)

(58) Field of Classification Search
CPC .. B60N 2/0715; B60N 2/0705; B60N 2/0818; B60N 2/0825; B60N 2/067;
(Continued)

(56) References Cited

U.S. PATENT DOCUMENTS 5,772,173 A * 6/1998 Couasnon ............ B60N 2/0705
248/430
5,797,575 A * 8/1998 Clausen ............... B60N 2/0705
248/429

(Continued)

FOREIGN PATENT DOCUMENTS

CN 101130347 A 2/2008
DE 196 44 768 A1 5/1997
(Continued)

OTHER PUBLICATIONS

International Search Report issued Nov. 12, 2013 in PCT/JP13/071729/ filed Aug. 9, 2013.
(Continued)

*Primary Examiner* — Nkeisha Smith
(74) *Attorney, Agent, or Firm* — Oblon, McClelland, Maier & Neustadt, L.L.P.

(57) ABSTRACT

A seat slide device includes lower rails and upper rails both formed substantially symmetrical bilaterally across a center in a width direction, and lock mechanisms on both sides of the upper rails to be engaged with the lower rails to lock them. An entire structure combining the lower rails, the
(Continued)

upper rails and the lock mechanisms is substantially symmetrical forward, backward, and bilaterally, and a force applied to the lower rails and the upper rails can be absorbed substantially evenly forward, backward, and left and right. Since the lock mechanisms have an elastic lock member in a substantially center part in a longitudinal direction, the lower rails and the upper rails are elastically deformable for reduction of a biased load at a time of locking, improvement in vibration absorption characteristic, and the like, and a plate thickness of each material can be made thinner than conventional for weight reduction.

10 Claims, 25 Drawing Sheets

(58) Field of Classification Search
CPC .. B60N 2/0232; B60N 2/0843; B60N 2/0875; B60N 2/085; B60N 2/123; B60N 2/06; B60N 2/0887; B60N 2/0732; B60N 2/072; B60N 2/071
See application file for complete search history.

(56) References Cited

U.S. PATENT DOCUMENTS

| | | | | |
|---|---|---|---|---|
| 5,918,847 | A * | 7/1999 | Couasnon | B60N 2/0705 248/430 |
| 6,742,753 | B2 * | 6/2004 | Klahold | B60N 2/0705 248/429 |
| 2008/0048087 | A1 * | 2/2008 | Kojima | B60N 2/0818 248/430 |
| 2010/0090082 | A1 * | 4/2010 | Kojima | B60N 2/0818 248/429 |
| 2012/0217775 | A1 | 8/2012 | Fujita et al. | |
| 2015/0083881 | A1 * | 3/2015 | Wrong | B60N 2/0705 248/429 |
| 2015/0314707 | A1 * | 11/2015 | Couasnon | B60N 2/0705 297/344.1 |

FOREIGN PATENT DOCUMENTS

| | | |
|---|---|---|
| EP | 0 765 777 A1 | 4/1997 |
| JP | 61-46243 | 3/1986 |
| JP | 3-85228 | 8/1991 |
| JP | 04-121235 | 4/1992 |
| JP | 08-011613 | 1/1996 |
| JP | 9-109744 | 4/1997 |
| JP | 2000-343988 | 12/2000 |
| JP | 2001-012421 | 1/2001 |
| JP | 2002-348607 | 12/2002 |
| JP | 2004-136895 | 5/2004 |
| JP | 2008-49891 | 3/2008 |
| JP | 2009-234504 | 10/2009 |
| JP | 2011-42302 | 3/2011 |

OTHER PUBLICATIONS

Extended European Search Report issued Feb. 11, 2016 in Patent Application No. 13879454.0.

* cited by examiner

Fig. 20
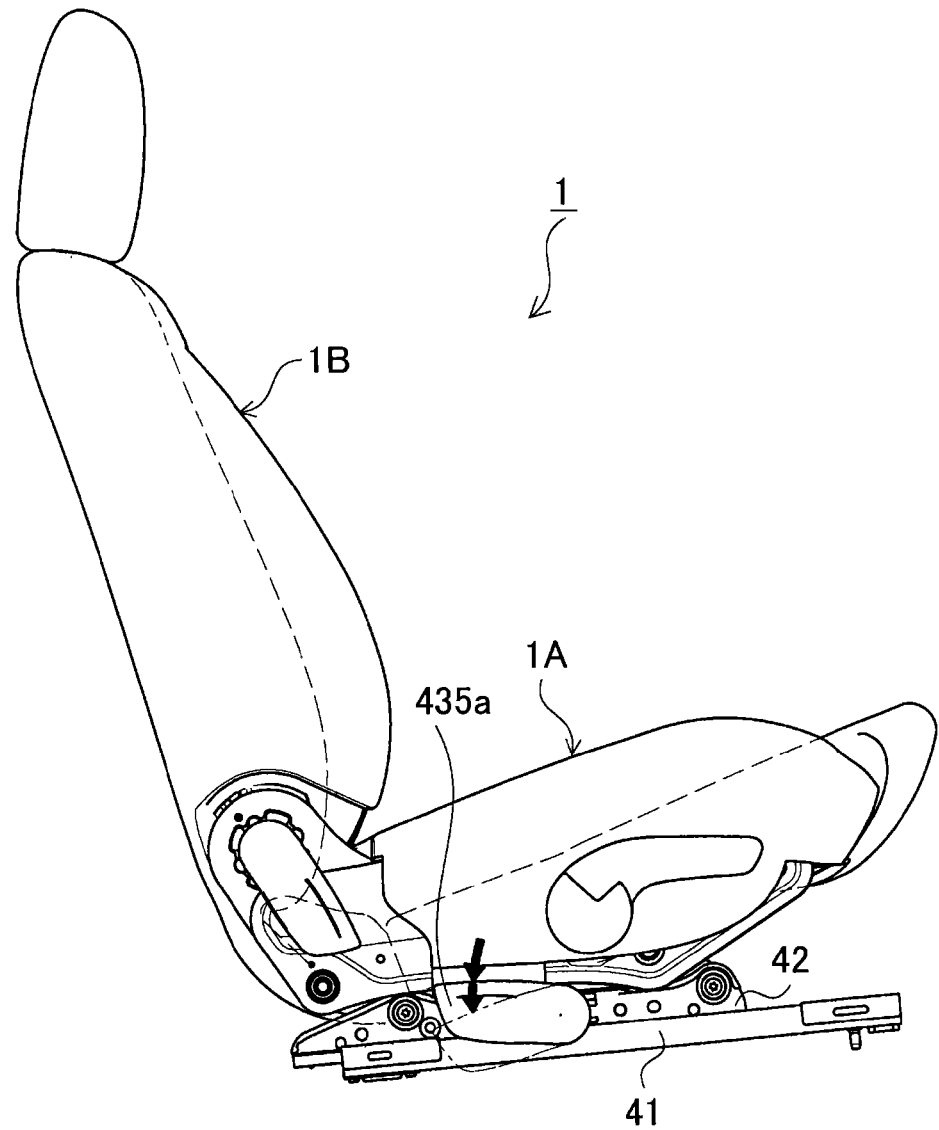
(a)
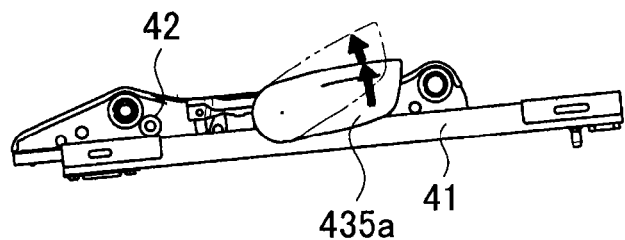
(b)

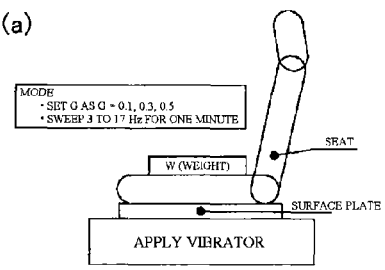
MODE
· SET G AS G = 0.1, 0.3, 0.5
· SWEEP 3 TO 17 Hz FOR ONE MINUTE
W (WEIGHT) — SEAT
SURFACE PLATE
APPLY VIBRATOR (b)

| SLIDE ANGLE θ (°) | FREQUENCY WHEN LOCKED — VERTICAL VIBRATION APPLIED MODE (SWEEP OF 3 TO 17 Hz BY ONE MINUTE) | | | | | | | | | | | | WHETHER TO LOCK — NORMAL SEATING | | |
|---|---|---|---|---|---|---|---|---|---|---|---|---|---|---|---|
| | G=0.1 | | | | G=0.3 | | | | G=0.5 | | | | | | |
| | WEIGHT W (kg) | | | | | | | | | | | | UNDER BUTTOCKS = 50 mm | UNDER BUTTOCKS = 100 mm | UNDER BUTTOCKS = 150 mm |
| | 0 | 20 | 40 | 60 | 0 | 20 | 40 | 60 | 0 | 20 | 40 | 60 | | | |
| 0 | | | | | | 4 | 3 | 3.1 | | 3.3 | 3.2 | 3.1 | LOCKED | LOCKED | LOCKED |
| 3 | | | 4 | 3.8 | | 3.8 | 3 | 3.2 | | 3.2 | 3.3 | 3 | LOCKED | LOCKED | LOCKED |
| 6 | | 4.1 | NONE | NONE | | 5.3 | NONE | NONE | | 3.4 | NONE | NONE | LOCKED | LOCKED | LOCKED |

(c)

| SLIDE ANGLE θ (°) | FREQUENCY WHEN LOCKED — VERTICAL VIBRATION APPLIED MODE (SWEEP OF 3 TO 17 Hz BY ONE MINUTE) | | | | | | | | | | | | WHETHER TO LOCK — NORMAL SEATING | | |
|---|---|---|---|---|---|---|---|---|---|---|---|---|---|---|---|
| | G=0.1 | | | | G=0.3 | | | | G=0.5 | | | | | | |
| | WEIGHT W (kg) | | | | | | | | | | | | UNDER BUTTOCKS = 50 mm | UNDER BUTTOCKS = 100 mm | UNDER BUTTOCKS = 150 mm |
| | 0 | 20 | 40 | 60 | 0 | 20 | 40 | 60 | 0 | 20 | 40 | 60 | | | |
| 0 | | | | | | 4.2 | 3.3 | 3 | | 3.5 | 3.2 | 3.1 | LOCKED | LOCKED | LOCKED |
| 3 | | | 4.3 | 3.3 | | 3.5 | 3.1 | 3.4 | | 3.6 | 3.3 | 3 | LOCKED | LOCKED | LOCKED |
| 6 | | | 5 | NONE | NONE | 4.7 | NONE | NONE | | 3.1 | NONE | NONE | LOCKED | LOCKED | LOCKED |

(d)

| SLIDE ANGLE θ (°) | FREQUENCY WHEN LOCKED — VERTICAL VIBRATION APPLIED MODE (SWEEP OF 3 TO 17 Hz BY ONE MINUTE) | | | | | | | | | | | | WHETHER TO LOCK — NORMAL SEATING | | |
|---|---|---|---|---|---|---|---|---|---|---|---|---|---|---|---|
| | G=0.1 | | | | G=0.3 | | | | G=0.5 | | | | | | |
| | WEIGHT W (kg) | | | | | | | | | | | | UNDER BUTTOCKS = 50 mm | UNDER BUTTOCKS = 100 mm | UNDER BUTTOCKS = 150 mm |
| | 0 | 20 | 40 | 60 | 0 | 20 | 40 | 60 | 0 | 20 | 40 | 60 | | | |
| 0 | | | | | | 4.3 | 3.1 | 3 | | 3.6 | 3.1 | 3 | LOCKED | LOCKED | LOCKED |
| 3 | | | 4.1 | 3.2 | | 3.6 | 3.2 | 3 | | 3.4 | 3.2 | 3 | LOCKED | LOCKED | LOCKED |
| 6 | | | 4.8 | 3 | NONE | 3.8 | NONE | NONE | | 3.6 | NONE | NONE | LOCKED | LOCKED | LOCKED |

(e)

| SLIDE ANGLE θ (°) | FREQUENCY WHEN LOCKED — VERTICAL VIBRATION APPLIED MODE (SWEEP OF 3 TO 17 Hz BY ONE MINUTE) | | | | | | | | | | | | WHETHER TO LOCK — NORMAL SEATING | | |
|---|---|---|---|---|---|---|---|---|---|---|---|---|---|---|---|
| | G=0.1 | | | | G=0.3 | | | | G=0.5 | | | | | | |
| | WEIGHT W (kg) | | | | | | | | | | | | UNDER BUTTOCKS = 50 mm | UNDER BUTTOCKS = 100 mm | UNDER BUTTOCKS = 150 mm |
| | 0 | 20 | 40 | 60 | 0 | 20 | 40 | 60 | 0 | 20 | 40 | 60 | | | |
| 0 | | | | | | | | | | | | 4.5 | NOT LOCKED | NOT LOCKED | LOCKED |
| 3 | | | 7.9 | 6.1 | | 6.1 | 4.5 | | | 5.2 | 5.1 | | LOCKED | LOCKED | LOCKED |
| 6 | | | 7.1 | 6.2 | | 3.4 | NONE | | | 3 | NONE | | LOCKED | LOCKED | LOCKED |

Fig. 25

| WEIGHT (kg) | SLIDE ANGLE θ | ACCELERATION G | PSEUDO-LOCK ⇒ LOCKED ○ (NOT LOCKED ×) | |
| --- | --- | --- | --- | --- |
| | | | AD² (EMBODIMENT) | SIDE BALL TYPE (COMPARATIVE EXAMPLE 1) |
| 20 | 0° | 0.1 | × | × |
| | | 0.3 | ○ | × |
| | | 0.5 | ○ | × |
| | 3° | 0.1 | × | × |
| | | 0.3 | ○ | × |
| | | 0.5 | ○ | × |
| | 6° | 0.1 | ○ | × |
| | | 0.3 | ○ | × |
| | | 0.5 | ○ | × |
| 40 | 0° | 0.1 | × | × |
| | | 0.3 | ○ | × |
| | | 0.5 | ○ | × |
| | 3° | 0.1 | ○ | × |
| | | 0.3 | ○ | × |
| | | 0.5 | ○ | × |
| | 6° | 0.1 | ○ | × |
| | | 0.3 | ○ | ○ |
| | | 0.5 | ○ | ○ |
| 60 | 0° | 0.1 | × | × |
| | | 0.3 | ○ | × |
| | | 0.5 | ○ | × |
| | 3° | 0.1 | ○ | × |
| | | 0.3 | ○ | × |
| | | 0.5 | ○ | × |
| | 6° | 0.1 | ○ | × |
| | | 0.3 | ○ | ○ |
| | | 0.5 | ○ | ○ |

SEAT SLIDE DEVICE

TECHNICAL FIELD

The present invention relates to a seat slide device used in a vehicle seat for automobiles, aircrafts, trains, boats and ships, buses, and the like.

BACKGROUND ART

A seat slide device has lower rails attached to a floor of a vehicle, and upper rails provided slidably on the lower rails and coupled to the seat frames (see Patent Documents 1 to 5). A lock mechanism is provided on the seat slide device, which is used by releasing locking and slide-adjusting a relative position of the upper rails with respect to a longitudinal direction of the lower rails, and locking at a desired position.

On the other hand, for vehicle seats, weight reduction is constantly demanded for fuel consumption improvement in view of energy conservation. Regarding seat main bodies, the present applicant has hitherto made various proposals on technology related to weight reduction. For example, the applicant proposed one having a structure in which a three-dimensional knitted fabric is strained as respective cushion members of a seat back part and a seat cushion part (see Patent Document 6), instead of urethane materials which are generally used widely.

PRIOR ART DOCUMENTS

Patent Document

Patent Document 1: Japanese Patent Application Laid-open No. H9-109744
Patent Document 2: Japanese Patent Application Laid-open No. H8-11613
Patent Document 3: Japanese Patent Application Laid-open No. 2004-136895
Patent Document 4: Japanese Unexamined Utility Model Application Laid-open No. S61-46243
Patent Document 5: Japanese Unexamined Utility Model Application Laid-open No. H3-85228
Patent Document 6: Japanese Patent Application Laid-open No. 2011-42302

DISCLOSURE OF THE INVENTION

Problems to be Solved by the Invention

Although there are various techniques regarding weight reduction related to the main body of a vehicle seat as described above, weight reduction of the seat slide device has not been considered so much except material substitutions. The seat slide device needs to have predetermined rigidity because various forces are applied thereto via a seat frame. Accordingly, lower rails, upper rails, and so on are conventionally formed of a steel material with a predetermined thickness (normally around 2 mm), and have a certain level of weight.

The present invention has been made in view of the above problems and it is an object thereof to provide a seat slide device suitable for weight reduction which can exhibit necessary functions upon receiving an applied force even when it is formed of a thinner material than conventional ones. Further it is another object of the present invention to provide a seat slide device which can exhibit necessary functions upon receiving an applied force even when it is formed of a thinner material than conventional ones, and can suppress increase in rattling and reduction of friction accompanying reduction in surface pressure due to decrease in plate thickness, are suitable for weight reduction, and can exhibit an impact absorbing function and a vibration absorbing function.

Means for Solving the Problem

In all of the conventional seat slide devices described in Patent Documents 1 to 5, the lock mechanism is disposed on one side of an upper rail, and an engaged part with which the lock mechanism engages is formed only on one side of a lower rail. Therefore, a force applied at a time of locking has to be supported only by one side of the lower rail via the lock mechanism, and consequently both the lower rail and the upper rail needs to be formed of a material having predetermined rigidity with a predetermined thickness. Focusing attention on this point, the present inventors have achieved weight reduction by a structure in which a biased load is applied as less as possible and have found that a seat slide device itself can have a vibration absorption function and an impact absorption function by a structure in which the upper rail and the lower rail elastically function, and have thereby completed the present invention.

Specifically, a seat slide device of the present invention is a seat slide device for supporting a seat frame constituting a vehicle seat and adjusting a position in a forward and backward direction of the vehicle seat, the seat slide device being structured to have a pair of lower rails attached to a floor of the vehicle at a predetermined interval in a width direction from each other, and a pair of upper rails, which are provided slidably on the lower rails, respectively, and to which the seat frame is coupled, and lock mechanisms for locking the upper rails with respect to the lower rails at an appropriate slide position, wherein the lock mechanisms have an elastic lock member supported on the upper rails and formed of an elastic member having lock claws engaging with engaged parts formed in the lower rails, and the elastic lock member is structured to become an elastic fulcrum and elasticity of the elastic lock member operates on the lower rails and the upper rails.

Further, a seat slide device of the present invention is a seat slide device for supporting a seat frame constituting a vehicle seat and adjusting a position in a forward and backward direction of the vehicle seat, the seat slide device being structured to have a pair of lower rails attached to a floor of the vehicle at a predetermined interval in a width direction from each other, and a pair of upper rails, which are provided slidably on the lower rails, respectively, and to which the seat frame is coupled, and lock mechanisms for locking the upper rails with respect to the lower rails at an appropriate slide position, wherein the lower rails and the upper rails are formed to be substantially symmetrical bilaterally with respect to a center in a cross-sectional shape orthogonal to a longitudinal direction, and the lock mechanisms are provided on both sides of the upper rails and structured to be capable of engaging with the lower rails to lock them.

Further, a seat slide device of the present invention is a seat slide device for supporting a seat frame constituting a vehicle seat and adjusting a position in a forward and backward direction of the vehicle seat, the seat slide device being structured to have a pair of lower rails attached to a floor of the vehicle at a predetermined interval in a width direction from each other, and a pair of upper rails, which are provided slidably on the lower rails, respectively, and to which the seat frame is coupled, and lock mechanisms for locking the upper rails with respect to the lower rails at an appropriate slide position, wherein the lower rails and the upper rails are formed to be substantially symmetrical bilaterally with respect to a center in a cross-sectional shape orthogonal to a longitudinal direction, the lock mechanisms are provided on both sides of the upper rails and structured to be capable of engaging with the lower rails to lock them, and the lock mechanisms have an elastic lock member supported on the upper rails and formed of an elastic member having lock claws engaging with engaged parts formed in the lower rails, and the elastic lock member is structured to become an elastic fulcrum and elasticity of the elastic lock member operates on the lower rails and the upper rails.

Preferably, the lower rails are each formed to be substantially symmetrical bilaterally with a substantially C-shaped cross section, having a bottom wall part, a pair of side wall parts standing up from both sides of the bottom wall part and opposing each other, and a pair of upper wall parts both bent inward from upper edges of the respective side wall parts with opposing edges separated from each other by a predetermined gap, and the upper rails are each formed to be bilaterally symmetrical with a substantially T-shaped cross section, having horizontal wall parts located inside the lower rails, and a vertical wall part to which the seat frame is coupled, the vertical wall part standing up substantially perpendicularly with respect to the horizontal wall parts, and projecting upward from a gap between the opposing edges of the pair of upper wall parts in the lower rails.

Preferably, the elastic lock member is formed of a spring steel and is structured to have an attaching plate part attached to the vertical wall parts of the upper rails, and an operating plate part which is integrally formed with the attaching plate part, has an elastic force to be constantly biased in a direction to depart from the attaching plate part attached to the vertical wall parts, and has the lock claws projecting in a direction to depart from the vertical wall parts and engaging with the plural engaged parts formed along the longitudinal direction in opposing parts in the respective lower rails, and the lock mechanisms are structured to have the elastic lock member and a lock release member which displaces the operating plate part in a direction of the vertical wall parts against the elastic force of the operating plate part, so as to release an engaging state of the lock claws and the engaged parts of the lower rails.

Preferably, the elastic lock member is attached to a substantially center part in the longitudinal direction of the upper rails. Preferably, in the elastic lock member, the operating plate part is bent downward from an upper part of the attaching plate part and has in a middle part an expanding part expanding in a direction to depart from the vertical wall parts of the upper rails, and the lock claws projecting in a direction to depart from the vertical wall parts are further formed on a lower edge, and the lock release member is structured to displace the expanding part of the operating plate part in a direction to the vertical wall parts, so as to release engagement of the lock claws. Preferably, the lock release member is structured to displace the expanding part of the operating plate part in the direction to the vertical wall parts by displacing, about one end, another end side upward or downward.

Preferably, respective one ends of the pair of lock release members sandwiching the vertical wall part of one of the upper rails and respective one ends of the pair of lock release members sandwiching the vertical wall part of the other one of the upper rails are coupled via a coupling shaft, and the four lock release members are structured to operate in synchronization by operating an operating part coupled to one end or both ends of the coupling shaft.

Preferably, the elastic lock member and the lock release member are each provided symmetrically on both sides across the vertical wall part of each of the upper rails, the plural engaged parts formed along the longitudinal direction of the lower rails are formed at symmetrical positions of both sides with respect to a center line along the longitudinal direction of the lower rails, and at a time of locking, the lock claws on both sides across the vertical wall part of each of the upper rails engage respectively with the engaged parts on both sides in the longitudinal direction of the lower rails.

Preferably, the respective upper wall parts of the lower rails have a shape such that downward oblique wall parts bent obliquely downward and toward a direction of the side wall parts extend from respective opposing edges, and the upper rails have upward oblique wall parts standing up obliquely from respective outer edge parts of the horizontal wall parts toward the vertical wall part, and these upward oblique wall parts are provided to be located outside the respective downward oblique wall parts of the lower rails, the engaged parts of the lower rails are formed of holes or trenches formed in the downward oblique wall parts, and auxiliary engaged parts constituted of holes or trenches are formed in the respective upward oblique wall parts of the upper rails corresponding to formation positions of the lock claws, the auxiliary engaged parts retaining, at a time of locking, the lock claws stably by that the lock claws penetrate the engaged parts of the respective lower rails and then engage therewith.

Preferably, the upper rails are provided with retaining members having inclining surfaces between the vertical wall parts and portions located on both sides of the vertical wall parts in the horizontal wall parts, and when a force in a direction to disengage the upper rails from the respective lower rails operates, the inclining surfaces of the retaining members are able to abut on the downward oblique wall parts of the respective lower rails, and a deformation of the horizontal wall parts is suppressed.

Preferably, the bottom wall parts of the lower rails have stepped parts such that a part of the bottom wall parts protrudes upward, and on vertically long cross-sectional portions of these stepped parts, at least one roller disposed between the lower rails and the upper rails is supported. Preferably, in the lower rails, the bottom wall parts have a part having an R-shaped cross-section in a corner on both ends in the width direction, a portion close to an inside of each part having an R-shaped cross-section is a stepped part protruding upward, and the roller has a width corresponding to a space between the stepped parts. Preferably, the bottom wall parts of the lower rails are formed in a shape such that a substantially center part in the width direction between the stepped parts expand upward. Preferably, by bending of a part between the stepped parts of the bottom wall parts of the lower rails by the weight of a person seated on the vehicle seat, friction resistance in a sliding direction becomes small as compared to a state before the part between the stepped parts bends.

Desirably, at least one of the pair of lower rails and the pair of upper rails is formed using a thin material with a thickness of 1.8 mm or less, preferably a thin material with a thickness of 0.6 mm to 1.6 mm, more preferably, a thin material with a thickness of 0.6 mm to 1.2 mm. Preferably, the thin material has tensile strength in a range of 400 to 590 MPa. Note that the lower rails can be formed of a thin material constituted of a spring steel, and the lower rails can be formed of a thin material constituted of a high-tensile steel having tensile strength of 780 MPa or more.

Preferably, the elastic lock member is formed using a spring steel with a thickness in a range of 0.6 to 1.2 mm, and is thereby preferably structured to be capable of suppressing a pseudo-lock state of the lock mechanisms by synergistic operation of various characteristics including a bending characteristic of the lock claws which is given by limiting an elastic operation and a thickness, a characteristic of friction resistance of a front end surface of the lock claws with respect to a part between adjacent engaged portions formed in the lower rails, elasticity of the lower rails and the upper rails, and rolling characteristic of the roller.

Preferably, in the lower rails, an easy deformation portion is set for a case where a predetermined force or more is applied in a direction to disengage the upper rails coupled to the seat frame from the lower rails. Preferably, a range of a predetermined width of at least respective opposing edges in the upper wall parts of the lower rails is a high-rigidity part with relatively high rigidity in the lower rails for suppressing opening of a gap between the opposing edges when a predetermined force or more operates in a direction to disengage the upper rails from the respective lower rails, and a range from vicinities of respective boundaries between the bottom wall part and the side wall parts to parts excluding upper parts in the side wall parts in the lower rails is the easy deformation portion of relatively lower rigidity than the high-rigidity parts.

Preferably, the high-rigidity part of the lower rails is, in addition to the range of a predetermined width of the respective opposing edges in the upper wall parts, formed in a range which goes beyond the range of this predetermined width in a cross-sectional direction to reach upper parts of the side wall parts. Preferably, the high-rigidity part of the lower rails is formed in a range excluding an inner surface on which the ball abuts in vicinities of respective boundary portions between the upper wall parts and the side wall parts. Preferably, the high-rigidity part is formed by a heat treatment.

Preferably, in vicinities of at least one ends in the longitudinal direction of the lower rails where a fixing part with respect to the floor is located, reinforcing plate-shaped members with a predetermined thickness are layered in at least one of the opposing pairs of side wall parts and upper wall parts, and by increasing a section modulus by layering the reinforcing plate-shaped members, opening of the gap between the opposing edges is suppressed when a predetermined force or more operates in a direction to disengage the upper rails from the respective lower rails. Preferably, the reinforcing plate-shaped members are layered on both ends in the longitudinal direction of the lower rails, and a part between both the ends on which the reinforcing plate-shaped members are layered is the high-rigidity part formed by the heat treatment. Moreover, preferably, the lower rails and the upper rails are structured to increase in section modulus in a vertical direction and improve in strength by a deformation accompanying an input of impact force.

Effects of the Invention

A seat slide device of the present invention has, as the lock mechanisms, an elastic lock member supported on upper rails and formed of an elastic member having lock claws engaging with engaged parts of lower rails. Therefore, by an elastic force of the elastic lock member, vibration and impact force can be alleviated. That is, the elastic lock member with high yield stress becomes an elastic fulcrum and elasticity thereof operates on the lower rails and the upper rails, and thus a structure for alleviating vibration and impact force can be simplified and weight reduction of the entire seat slide device is possible. Further, by the elastic force of the elastic lock member, a biased load applied to the upper rails and the lower rails can be absorbed while elastically deforming. Further, by an elastic deformation with the upper rails and the lower rails being an elastic fulcrum, rattling or friction between them is reduced. Moreover, a separate spring member for the lock claws to engage with, a rotation shaft supporting the lock claws, and the like are not necessary, and this point also contributes to weight reduction of the seat slide device.

Further, it is a structure in which by enhancing rigidity of the range of a predetermined width of at least opposing edges in respective upper wall parts of the lower rails, a deformation in this high-rigidity part can be prevented, and is a structure in which a deformation in vicinities of ends in a longitudinal direction of the lower rails can be prevented by increasing a section modulus by layering a reinforcing plate member on at least one end of the lower rails, preferably both ends. Therefore, at a time of inputting a large load, by a high deformation preventing function at a portion where the high-rigidity part or the reinforcing plate member is layered, the upper rails are retained without disengaging from the lower rails. Consequently, an easy deformation portion other than the portion where the high-rigidity part or the reinforcing plate member is layered in the lower rails deforms without disengagement of the upper rails. Therefore, by providing such a high-rigidity part or the portion where the reinforcing plate member is layered, an absorbing function of energy due to impact force or vibration can be enhanced more.

Further, by forming the upper rails and the lower rails by a thin material with a predetermined thickness or less, and setting the high-rigidity part or the above-described portion where the reinforcing plate member is layered to a predetermined portion, it can be a structure in which the above-described elastic operation of the upper rails and the lower rails in the vicinity of the portion where the elastic lock member is disposed functions reliably.

Further, the seat slide device of the present invention is preferably structured such that the lower rails and the upper rails are both formed to be substantially symmetrical bilaterally across a center in a width direction (cross-sectional direction orthogonal to a longitudinal direction), and the lock mechanisms are provided on both sides of the upper rails and each of them can be engaged with the lower rails to lock them. Thus, the entire structure combining the lower rails, the upper rails and the lock mechanisms is substantially symmetrical bilaterally, and a force applied to the lower rails and the upper rails can be absorbed substantially evenly left and right. Application of a biased load to the lower rails and the upper rails at a time of locking as conventionally occurred can be reduced, and plate thicknesses of respective materials constituting them can be made thinner than conventional products. Thus, further weight reduction can be achieved.

BRIEF DESCRIPTION OF DRAWINGS

FIG. 20(a) is a view explaining a mode of using an operating part by pushing down, and FIG. 20(b) is a view explaining a mode of using the operating part by operating the operating part upward.

FIG. 24(a) is a diagram for explaining a test method for comparing easiness of locking of the seat slide device according to the embodiment and the seat slide devices according to the comparative examples, (b) to (d) illustrate test results of the seat slide devices according to the embodiment, and (e) illustrate test results of the seat slide device according to a comparative example.

FIG. 25 is a diagram illustrating whether pseudo-lock occurred or not in the test results of FIG. 24 by summarizing.

BEST MODE FOR CARRYING OUT THE INVENTION

Figure 1:
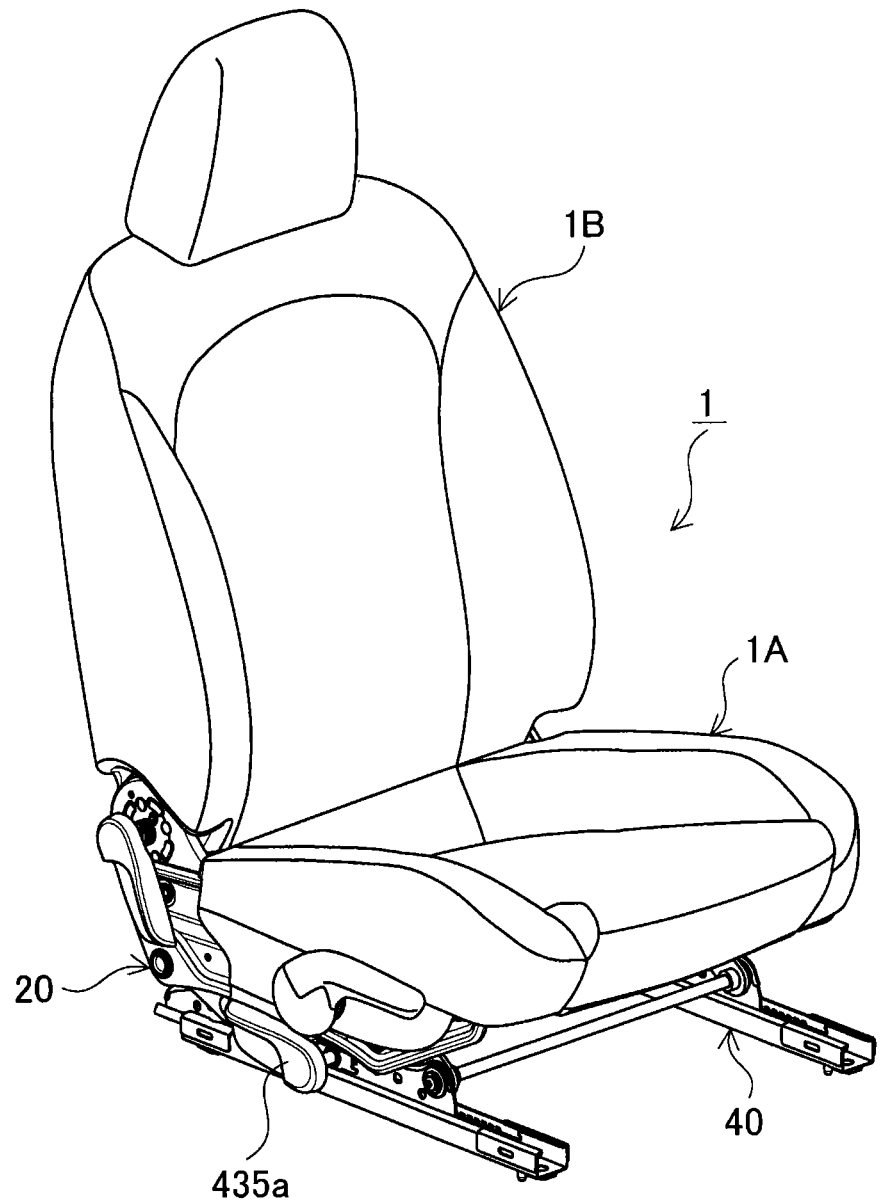
FIG. 1 is a perspective view illustrating an appearance of a vehicle seat using a seat slide device according to one embodiment of the present invention.
Figure 2:
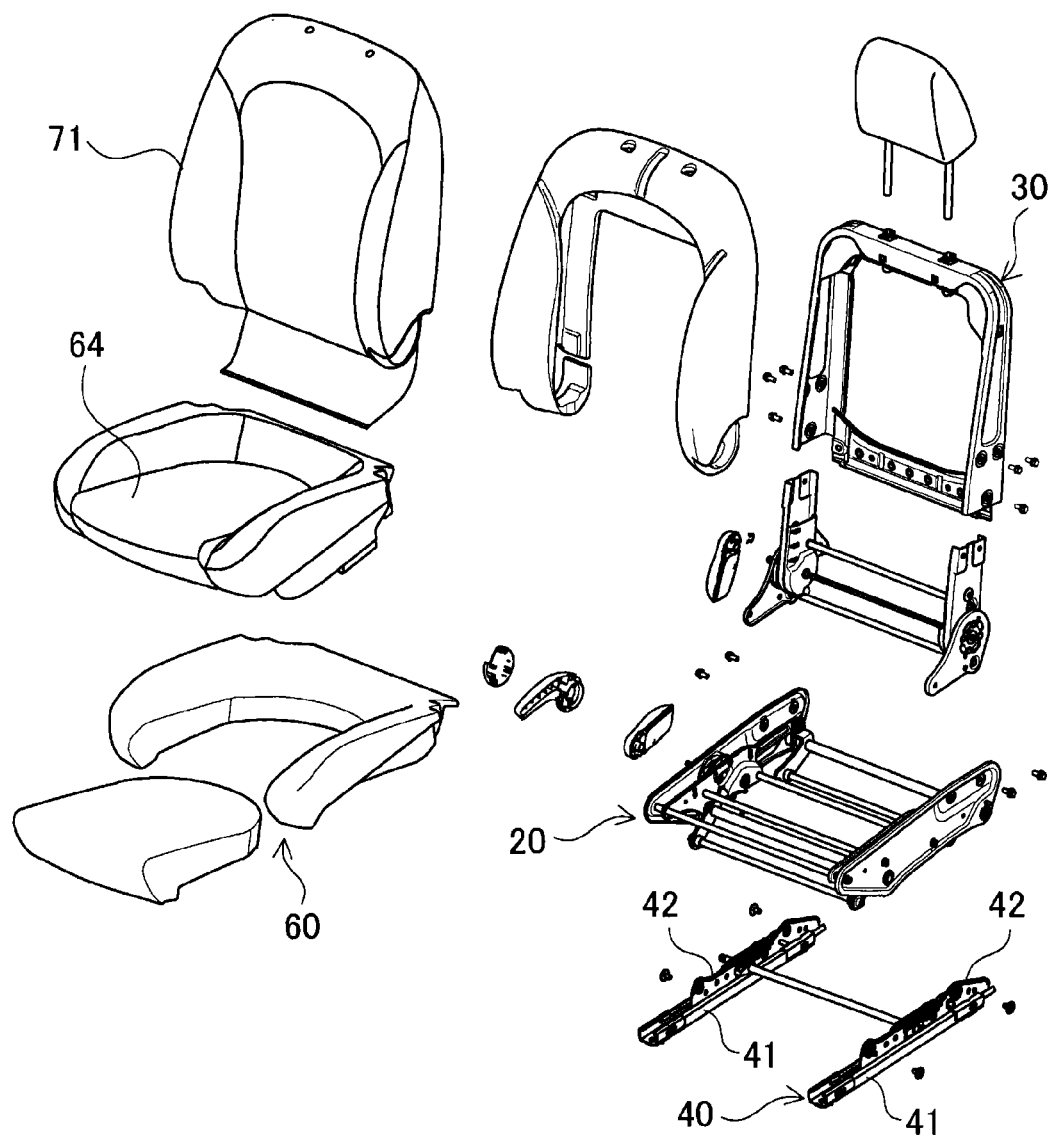
FIG. 2 is an exploded perspective view of FIG. 1.
Figure 3:
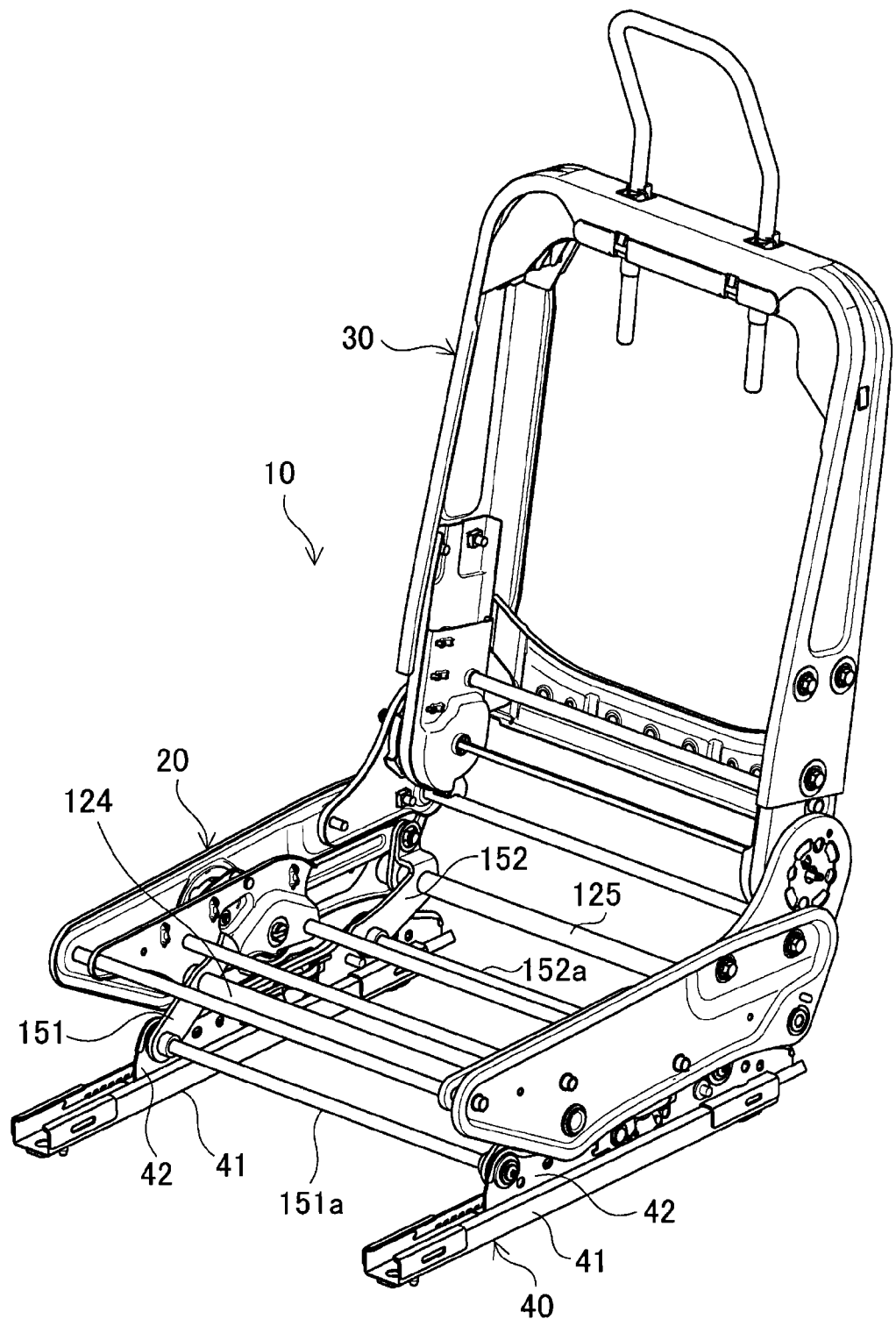
FIG. 3 is a perspective view of a seat frame and a seat slide device of the vehicle seat according to the embodiment seen from an oblique right front side.
Figure 4:
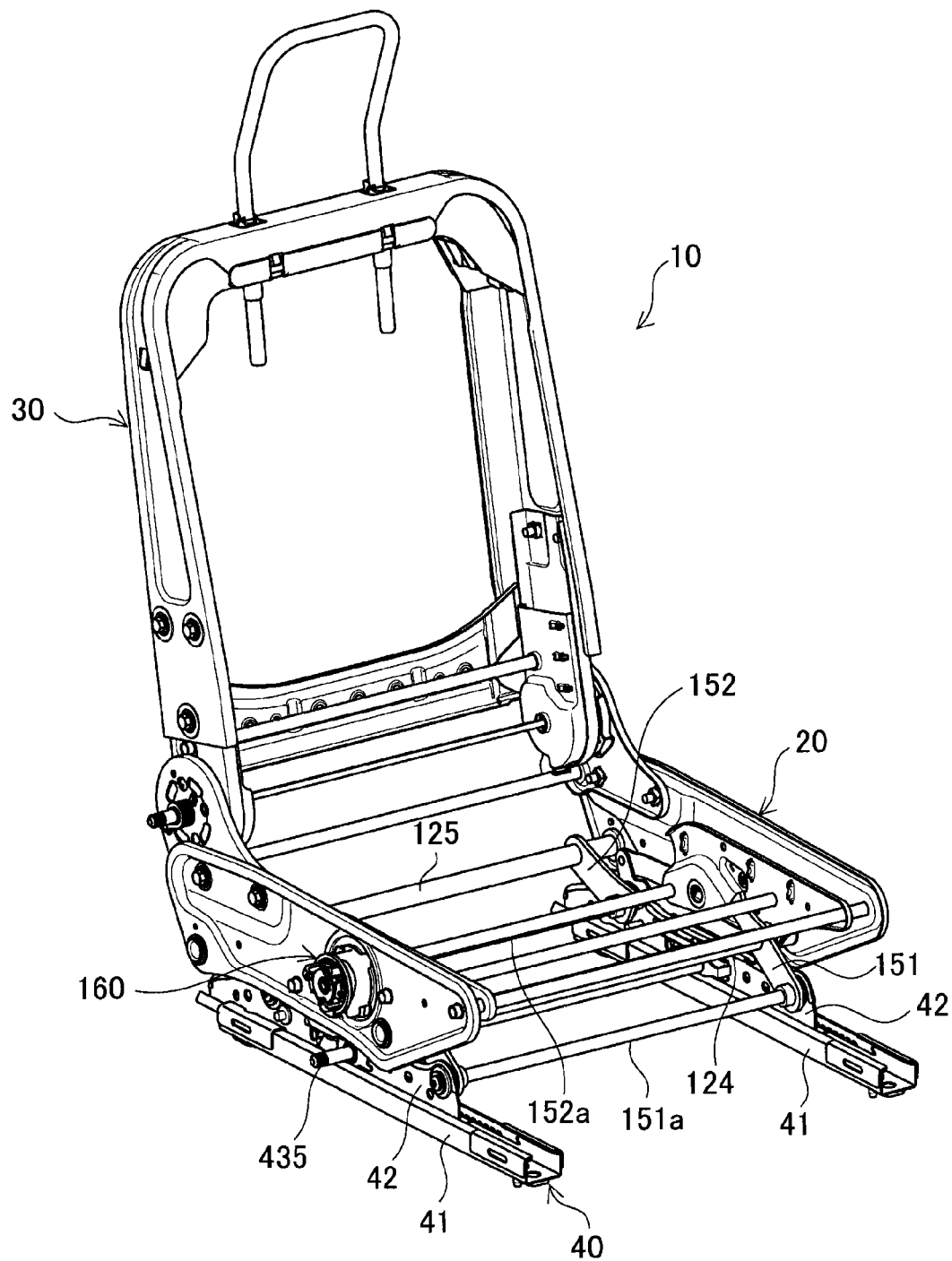
FIG. 4 is a perspective view of the seat frame and the seat slide device of the vehicle seat according to the embodiment seen from an oblique left front side.
Figure 5:
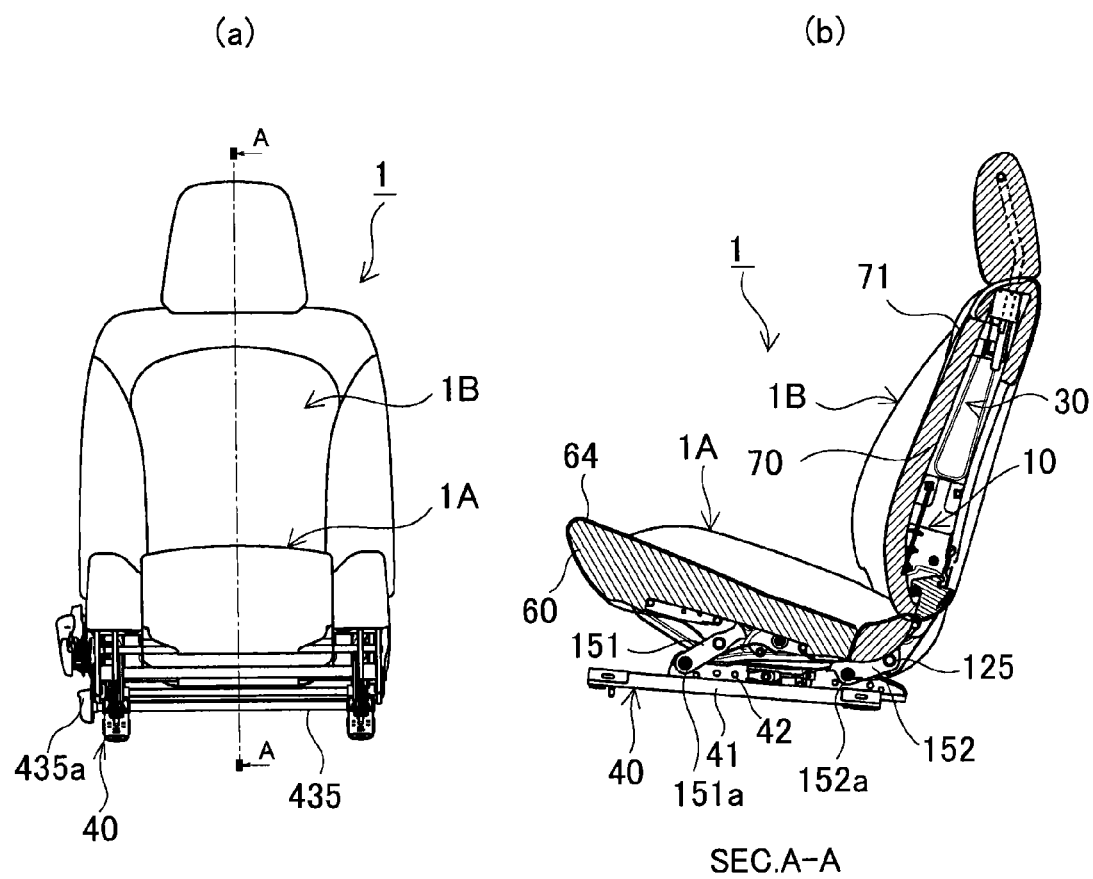
FIG. 5(a) is a front view of the vehicle seat according to the embodiment and FIG. 5(b) is an A-A cross-sectional view of (a).

Hereinafter, the present invention will be described in further detail based on an embodiment illustrated in drawings. As illustrated in FIG. 1 to FIG. 5, a vehicle seat 1 has a cushion frame 20 and a back frame 30 constituting a seat frame 10. On the cushion frame 20, a cushion member 60 for a seat cushion part 1A and further an outer layer member 64 thereof are disposed, and on the back frame 30, a cushion member 70 for a seat back part 1B is disposed, and they are structure to be covered with an outer layer member 71 and a trunk side support member 72. Among them, the cushion frame 20 of the seat frame 10 is supported by a seat slide device 40 according to this embodiment fixed to a floor of a vehicle such as an automobile.

The seat slide device 40 is, as illustrated in FIG. 6 to FIG. 14, structured to have a pair of lower rails 41, 41 attached to the floor of the vehicle at a predetermined interval in a width direction from each other, and a pair of upper rails 42, 42 provided slidably on the lower rails 41, 41, respectively.

The lower rails 41, 41 are formed to be substantially symmetrical bilaterally with a substantially C-shaped cross section, having a bottom wall part 411, a pair of side wall parts 412, 412 standing up from both sides of the bottom wall part 411 and opposing each other, and a pair of upper wall parts 413, 413 both bent inward from upper edges of the respective side wall parts 412, 412 with opposing edges separated from each other by a predetermined gap.

Figure 12:
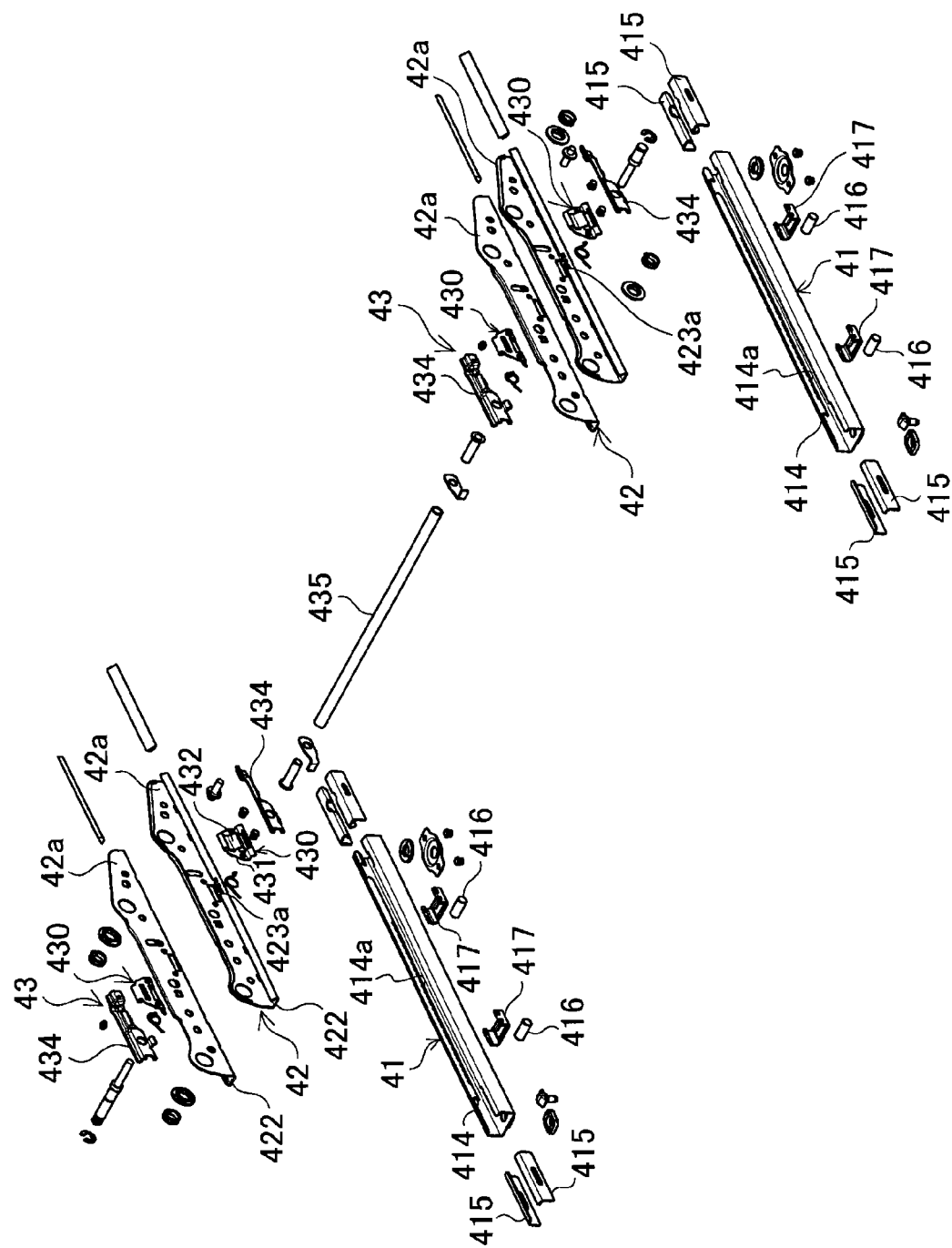
FIG. 12 is an exploded perspective view of the seat slide device according to the embodiment.

The upper rails 42, 42 are such that members 42a, 42a, whose cross-sectional shape in a direction orthogonal to the longitudinal direction is a substantially L shape, are put together back-to-back and integrated, and their cross-sectional shape in the integrated state is substantially reverse T shape and hence is substantially symmetrical bilaterally about a center (see FIG. 12). Attaching holes 421a, 421b are formed by penetrating close to the front sides and the rear sides, respectively, of the upper rails 42, 42.

Specifically, a shaft member 151a is bridged across the attaching holes 421a, 421a close to front sides of the upper rails 42, 42, and a shaft member 152a is bridged across the attaching holes 421b, 421b close to rear sides thereof. Lower ends of first links 151, 151 are pivotally supported on respective ends of the shaft member 151a, and lower ends of second links 152, 152 are pivotally supported on respective ends of the shaft member 152a (see FIG. 3 to FIG. 5). Then, upper ends of the first links 151, 151 are pivotally supported on a beam 124 bridged over close to a front side of the cushion frame 20 in a width direction, and upper ends of the second links 152, 152 are pivotally supported on a beam 125 bridged over close to a rear side of the cushion frame 20 in the width direction. One of the second links 152 is coupled to a lifter mechanism part 160, and the cushion frame 20 is structured to move up and down when an operating part 161 of the lifter mechanism part 160 is operated. Note that the cushion frame 20 is not limited in its supporting method as long as it is supported by the upper rails 42, 42, and for example, and when it is unnecessary to move the cushion frame 20 up and down as in this embodiment, arbitrary positions of the cushion frame 20 can also be coupled to the upper rails 42, 42 without interposing the links.

The lower rails 41, 41 and the upper rails 42, 42 are formed to be substantially symmetrical bilaterally across a center line in the longitudinal direction of the respective members (line passing through a center in a cross-sectional shape orthogonal to the longitudinal direction). Thus, a force transmitted via the first links 151, 151 and the shaft member 151*a* and a force transmitted via the second links 152, 152 and the shaft member 152*a* both operate substantially evenly left and right to the respective members. That is, rather than receiving these forces in a manner biased to either direction, these forces can be received in a manner dispersed substantially evenly on the left and right, and a deformation when an impact force is applied attempts to occur substantially evenly on the left and right. As a result, as a material constituting the lower rails 41, 41 and the upper rails 42, 42, one thinner than conventional ones, for example, one with a plate thickness of 1.8 mm or less, preferably one with a plate thickness in the range of 0.6 to 1.6 mm, more preferably one with a plate thickness in the range of 0.6 to 1.2 mm, furthermore preferably one with a plate thickness in the range of 0.6 to 1.0 mm is used. Note that as the material constituting them, preferably, one with tensile strength in the range of 400 to 590 MPa is preferred. This is because a small energy amount is needed for processing, and shaping can be done with a relatively small press machine, which can contribute to demands of energy saving and help to reduce manufacturing costs. There is also an advantage that, since it is a general material which can be easily obtained, material procurement is possible in many countries of the world, contributing to increasing countries of production and production bases, consequently helping to reduce overall costs of the seat slide device of the present invention and vehicle seats using this. Further, the lower rails 41, 41 are formed substantially symmetrically in front and rear in the longitudinal direction with a center part in the longitudinal direction being a boundary. The upper rails 42, 42 both have a shape such that the attaching holes 421*a*, 421*a* close to the front sides and the attaching holes 421*b*, 421*b* close to the rear sides both expand upward, and are formed so that the front and rear in the longitudinal direction are substantially symmetrical as much as possible. Thus, a load related to the longitudinal direction can easily be dispersed in the entire longitudinal direction, which is suitable for applying the thin material.

When the lower rails 41, 41 and the upper rails 42, 42 are constituted of the thin material, a contrivance is needed such that the above-described deformation due to an impact force becomes closer to a deformation which is substantially even left and right, and that the upper rails 42, 42 do not disengage from the lower rails 41, 41 by an impact force in a predetermined range.

Figure 6:
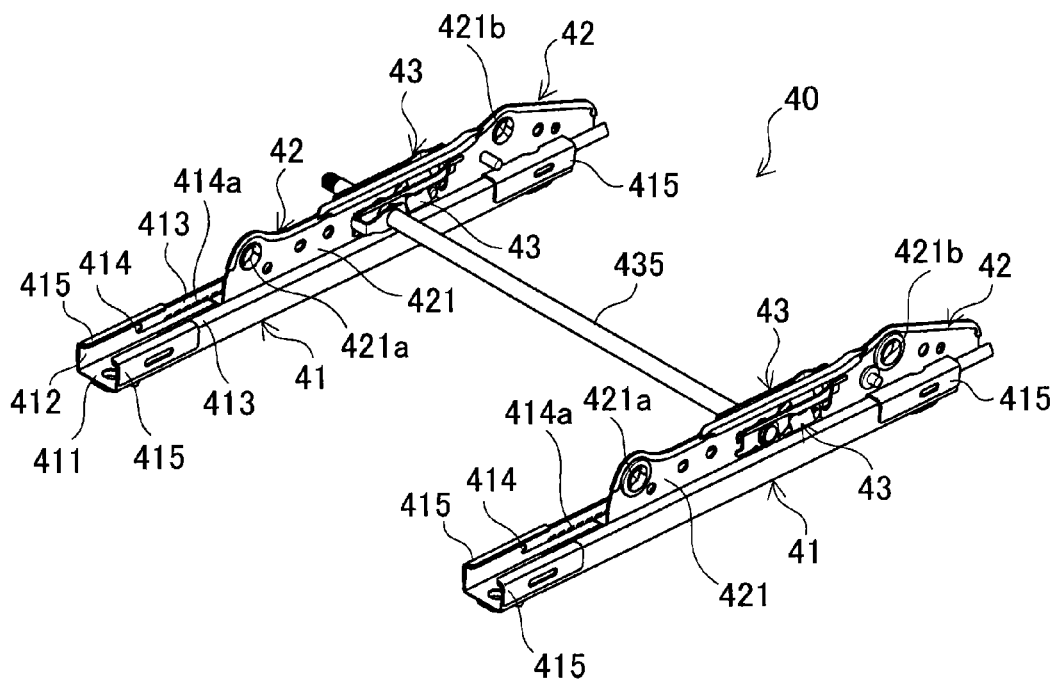
FIG. 6 is a perspective view of the seat slide device according to the embodiment seen from an oblique right front side.
Figure 7:
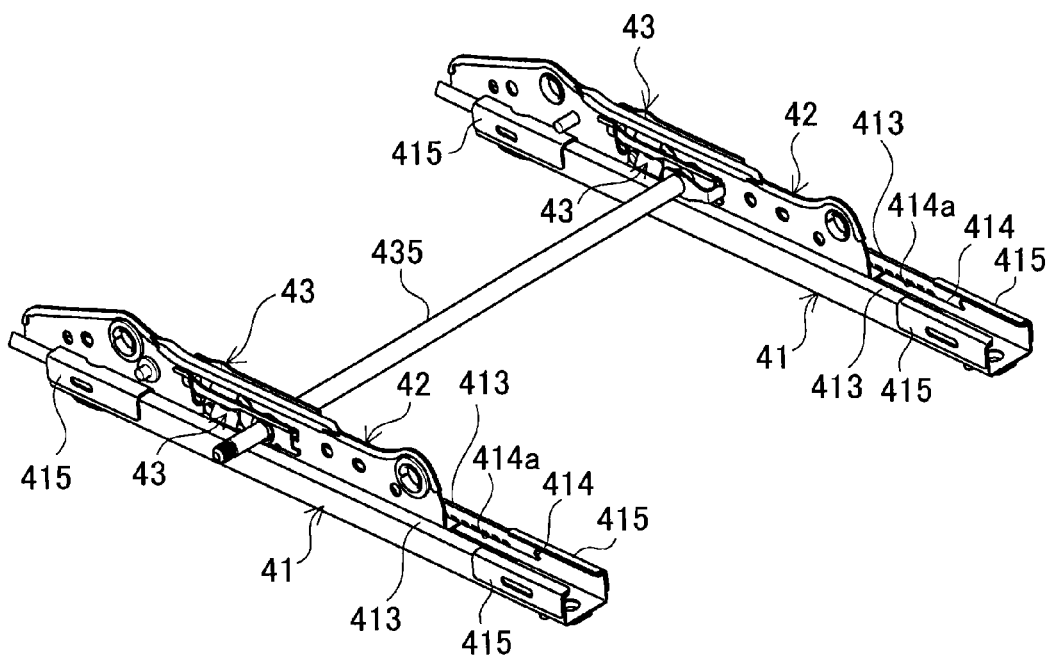
FIG. 7 is a perspective view of the seat slide device according to the embodiment seen from an oblique left front side.
Figure 8:
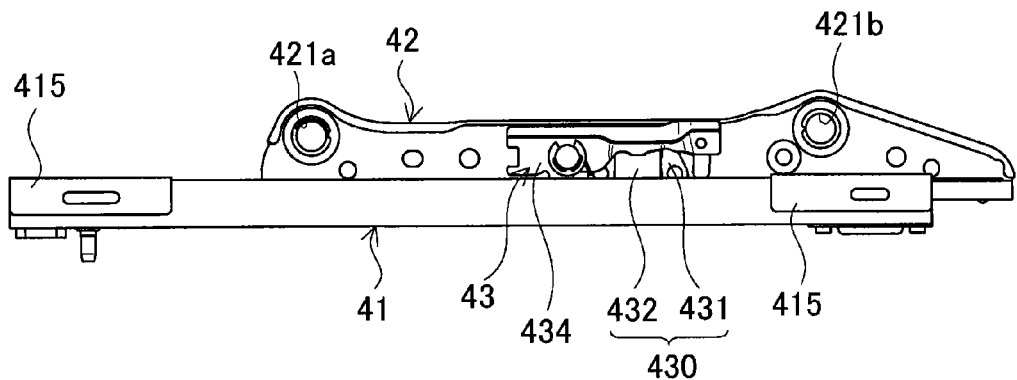
FIG. 8 is a side view of the seat slide device according to the embodiment.
Figure 9:
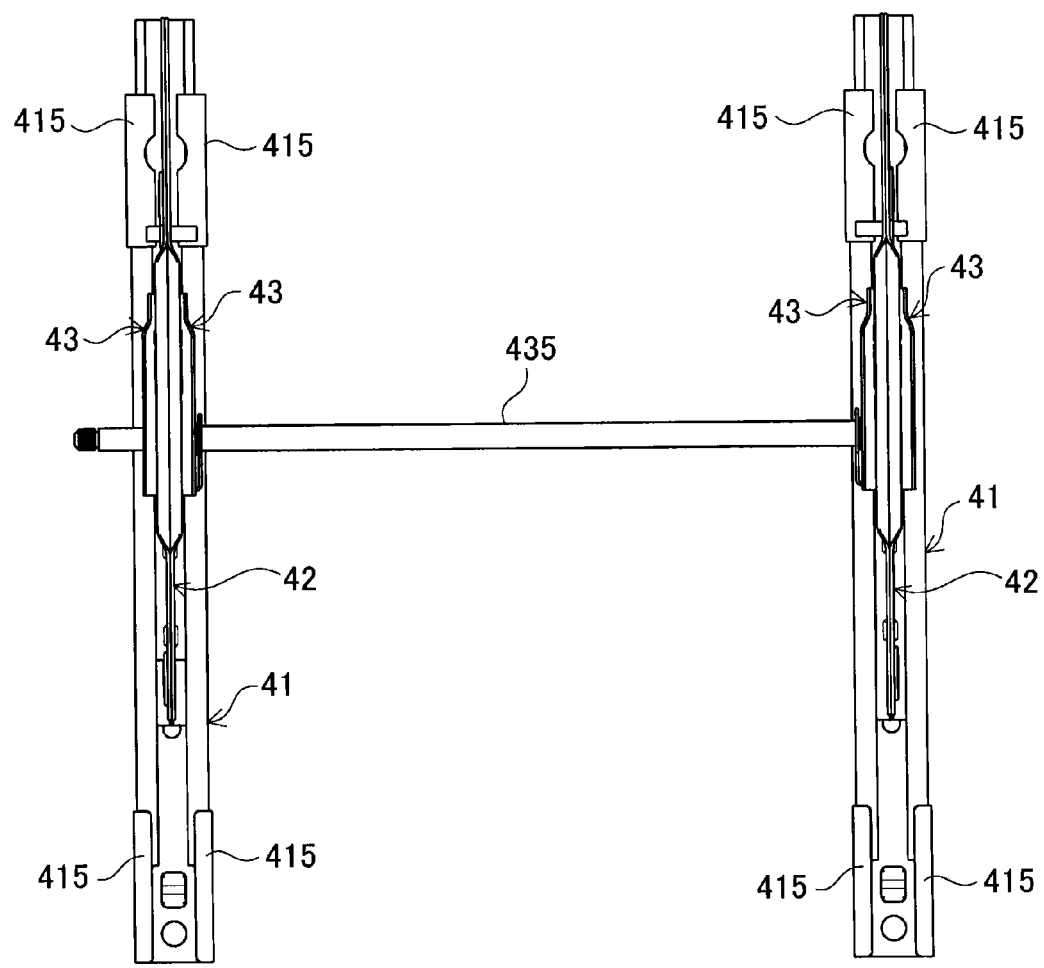
FIG. 9 is a plan view of the seat slide device according to the embodiment.
Figure 10:
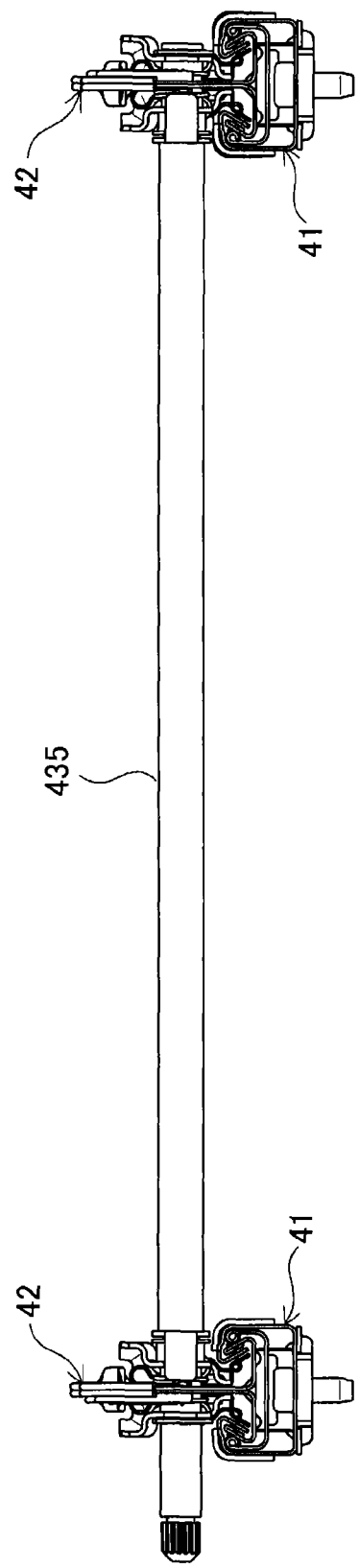
FIG. 10 is a front view of the seat slide device according to the embodiment.
Figure 11:
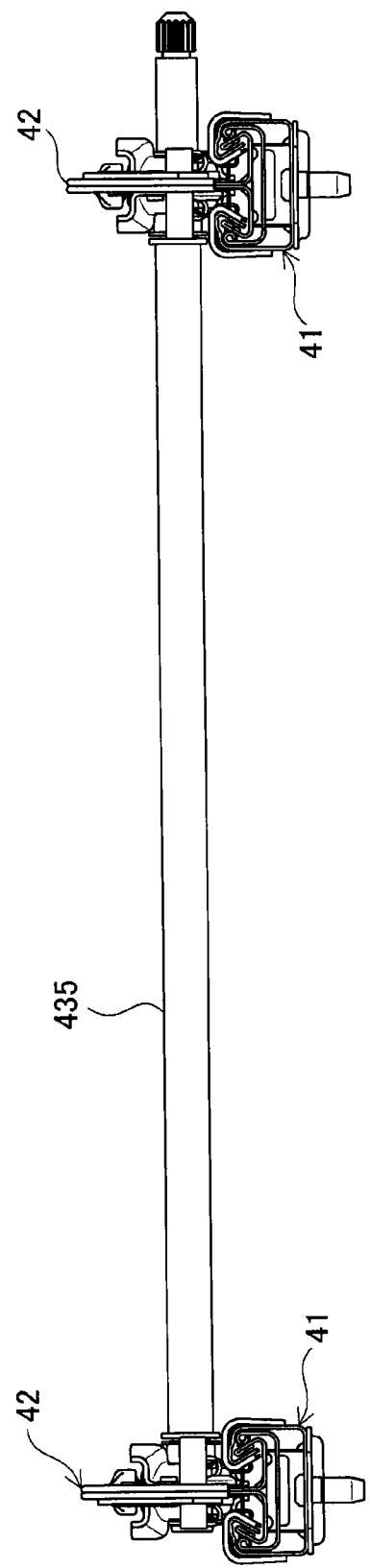
FIG. 11 is a rear view of the seat slide device according to the embodiment.

Accordingly, in this embodiment, a lock mechanism 43 which fixes a relative position of the upper rails 42, 42 to the lower rails 41, 41 is provided on both sides of vertical wall parts 421, 421 of the upper rails 42, 42, as illustrated in FIG. 6 and FIG. 7. Thus, lock claws 433 of the lock mechanisms 43, 43 at symmetrical positions across the vertical wall parts 421, 421 of the respective upper rails 42, 42 consequently engage with engaged parts of the upper wall parts 413, 413 of the lower rails 41, 41. In other words, the posture and the operating direction of an engaging force in a state that the lock claws 433 are engaged at a time of locking are also substantially symmetrical bilaterally, and thus a biased load does not easily occur at a time of locking.

Figure 13:
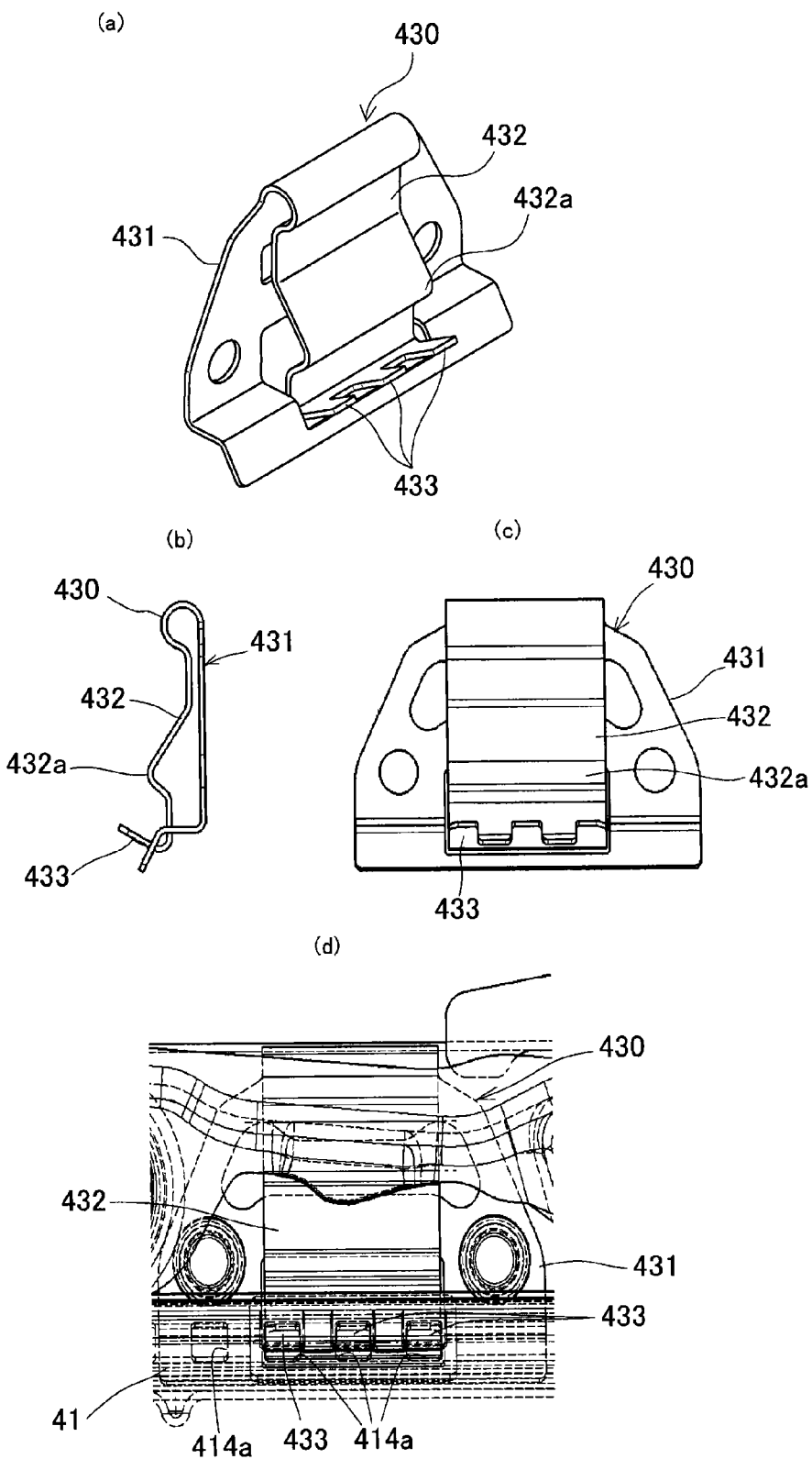
FIG. 13 are views illustrating structures of an attaching plate part of an elastic lock member, an operating plate part, and lock claws constituting the lock mechanism, (a) is a perspective view, (b) is a side view, (c) is a front view, and (d) is a view illustrating an engaging state of the lock claws and engaged parts formed in a lower rail.
Figure 14:
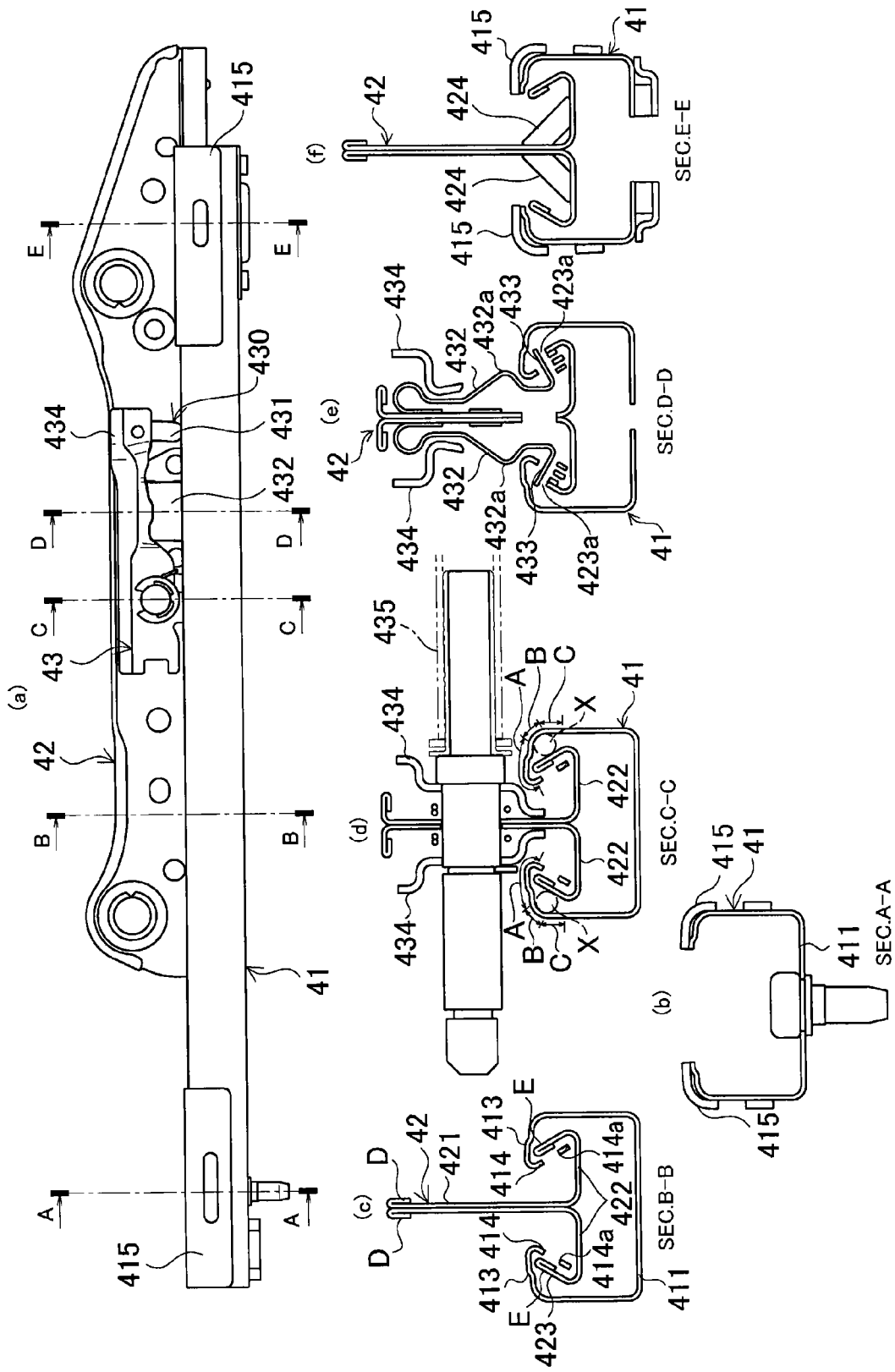
FIG. 14(a) is a side view of the seat slide device according to the embodiment.
FIG. 14(b) is an A-A cross-sectional view of (a)
FIG. 14(c) is a B-B cross-sectional view of (a)
FIG. 14(d) is a C-C cross-sectional view of (a)
FIG. 14(e) is a D-D cross-sectional view of (a)
FIG. 14(f) is an E-E cross-sectional view of (a).

Specifically, as illustrated in FIG. 12 and FIG. 13, the lock mechanism 43 is structured to have an elastic lock member 430 and a lock release member 434. The elastic lock member 430 is formed of a spring steel (leaf spring) and is structured to have an attaching plate part 431 fixed to the upper rails 42, 42, and an operating plate part 432 which is supported by the attaching plate part 431, has an elastic force to be constantly biased in a direction to depart from the vertical wall parts 421, 421 of the upper rails 42, 42, and has plural lock claws 433 projecting in a direction to depart from the vertical wall parts 421, 421 and engaging with engaged parts formed along the longitudinal direction in opposing portions in the respective lower rails 41, 41. The lock release member 434 displaces this operating plate part 432 in a direction of the vertical wall parts 421, 421 of the upper rails 42, 42 against the elastic force of the operating plate part 432, so as to release the engaging state of the lock claws 433 and the engaged parts of the lower rails 41, 41.

Here, the elastic lock member is preferred to be formed using a thin member with a thickness in the range of 0.6 to 1.2 mm. More preferably, it is with a thickness in the range of 0.6 to 1.2 mm, furthermore preferably a thickness in the range of 0.6 to 1.0 mm.

The attaching plate part 431 of the elastic lock member 430 has a shape along the vertical wall parts 421, 421 of the upper rails 42, 42, and is fixed by rivets or the like. The operating plate part 432 is integrated with the attaching plate part 431, and is bent on an opposite direction side of the vertical wall parts 421, 421 of the respective upper rails 42, 42 and downward from an upper edge of the attaching plate part 431, as illustrated in FIG. 13. Further, it has an expanding part 432*a* expanding in the direction to depart from the vertical wall parts 421, 421 of the respective upper rails 42, 42 in a middle portion. The lock claws 433 are formed in a comb shape by bending to project in a direction to depart from the vertical wall parts 421, 421 in the vicinity of a lower edge of the operating plate part 432 which is lower than the expanding part 432*a*. Note that preferably the attaching plate part 431 constituting the elastic lock member 430 is provided in a substantially center part in the longitudinal direction of the upper rails 42, 42. As will be described later, the elasticity of the elastic lock member 430 operates on the upper rails 42, 42 and the lower rails 41, 41 to make the lower rails 41, 41 and the upper rails 42, 42 be substantially deformable so as to give an absorbing function or the like of energy due to vibration or impact force, and the above position is for allowing this function to be effectively exhibited.

The lock release member 434 is provided so that another side pivots upward or downward about one side, and when it attempts to pivot along an outer surface of the operating plate part 432 and contacts the expanding part 432*a*, this expanding part 432*a* is consequently displaced in the direction of the vertical wall parts 421, 421. Thus, the lock claws 433 displace in the direction of the vertical wall parts 421, 421, and thus the engaging state is released. Respective one ends of the lock release members 434, that is, the four lock release members 434 in total are coupled by a coupling shaft 435 bridged across the left and right upper rails 42, 42. Therefore, by operating the operating part 435*a* coupled to either end of the coupling shaft 435 (see FIG. 1), the four lock release members operate in synchronization to release the lock.

Here, the respective upper wall parts 413, 413 of the lower rails 41, 41 have a shape such that downward oblique wall parts 414, 414 bent obliquely downward and toward the direction of the side wall parts 412, 412 extend from respective opposing edges, and the above-described engaged parts 414a, 414a of the respective lower rails 41, 41 are constituted of plural holes or trenches formed corresponding to intervals of adjacent claws of the comb-shaped lock claws 433 along the longitudinal direction in the downward oblique wall parts 414, 414 (see FIG. 6, FIG. 7, FIG. 13, FIG. 14).

The engaged parts 414a, 414a constituted of holes or trenches are formed with a length of several mm to several tens of mm along the longitudinal direction, and formed so that an interval of adjacent ones in the longitudinal direction is few mm to few tens of mm. Therefore, the comb-shaped lock claws 433 are formed with a length and at an interval corresponding to them (see FIG. 13(d)).

Here, a state that the lock claws 433 do not fully enter the corresponding engaged parts 414a and are stuck incompletely is called a pseudo-lock (or half lock) state, and in this embodiment, the thickness of the lock claws 433 are quite thin as described above. Thus, when the lock claws 433 attempt to stay in a region between the adjacent engaged parts 414a, 414a, staying in the region between the engaged parts 414a, 414a is rather a quite unstable state since the contact area of a front end surface of the lock claws 433 is quite small and hence has small frictional resistance, and they also easily bend by elasticity of the lock claws 433 and thus are easily led in a direction to enter the engaged parts 433a by a small body movement of the seated person, slight vibration from the floor, or the like. Further, there also operate the elasticity of the lower rails 41, 41 and the upper rails 42, 42 constituted of the above-described thin material as well as various characteristics including a rolling characteristic of rollers 416, 416b for sliding provided in the vicinity of the respective ends of the lower rails 41, 41, which will be described later, and thus by their synergistic operation, the seat slide device 1 of this embodiment has a characteristic that the pseudo-lock state does not easily occur. Note that this characteristic will be further described in detail in later-described experimental examples.

Further, as illustrated in FIG. 14(c), the respective upper rails 42, 42 have upward oblique wall parts 423, 423 standing up obliquely from respective outer edge parts of horizontal wall parts 422, 422 having a substantially T shape toward the vertical wall part 421, and these upward oblique wall parts 423, 423 are provided to be located outside the downward oblique wall parts 414, 414 of the respective lower rails 41, 41. Further, in the respective upward oblique wall parts 423, 423 of the upper rails 42, 42 corresponding to formation positions of the lock claws 433, auxiliary engaged parts 423a, 423a constituted of holes or trenches are formed (see FIG. 12 and FIG. 14(e)). The auxiliary engaged parts 423a, 423a retain the lock claws 433 stably in an engaged state by that the lock claws 433 penetrate the engaged parts 414a, 414a of the respective lower rails 41, 41 and then engage therewith at a time of locking. Therefore, also by this structure, a function to maintain a bilaterally substantially symmetrical stable mode at a time of locking is exhibited.

When the lower rails 41, 41 and the upper rails 42, 42 are formed of thin one, as a contrivance to prevent disengagement of the upper rails 42, 42 from the lower rails 41, 41 by an impact force in a predetermined range, in this embodiment, a predetermined portion is made as a high-rigidity part having higher rigidity than other portions.

Specifically, a range of a predetermined width (range indicated by symbol A in FIG. 14(d) (open cross section part), preferably including portions close to upper parts of the downward oblique wall parts 414, 414 extending in the upper wall parts 413, 413) of at least respective opposing edges of the upper wall parts 413, 413 of the lower rails 41, 41 is made as the high-rigidity part. Thus, when a predetermined force or more operates in a direction to disengage the upper rails 42, 42 from the respective lower rails 41, 41, opening of the gap between the opposing edges can be suppressed by rigidity in the longitudinal direction. As a result of forming high-rigidity parts in the upper wall parts 413, 413, the range from the vicinities of respective boundaries between the bottom wall part 411 and the side wall parts 412, 412 to parts excluding upper parts in the side wall parts 412, 412 in the lower rails 41, 41 is a portion of relatively lower rigidity than the high-rigidity parts of the upper wall parts 413, 413. Therefore, when a predetermined force or more is applied in a direction to disengage the upper rails 42, 42 from the respective lower rails 41, 41, a force is received in the portions of high rigidity and then the force is dispersed in the longitudinal direction, the portions of relatively low rigidity become an easy deformation portion, the upper rails 42, 42 do not disengage from the lower rails 41, 41, and the easy deformation portions deform to elongate in the upward and downward direction. Thus, it is possible to exhibit an absorbing characteristic of high impact force. As means for forming the above-described high-rigidity parts, preferably, a heat treatment is employed. The rigidity can be increased without increasing the weight of the seat slide device 40.

Further, the high-rigidity part is, in addition to the range of a predetermined width of the respective opposing edges in the upper wall parts 413, 413 (range indicated by symbol A in FIG. 14(d)), preferably structured to be formed in a range which goes beyond the range of this predetermined width in the cross-sectional direction to reach upper parts of the side wall parts 412, 412 (ranges indicated by symbols B, C in FIG. 14(d)). However, in this case, in the vicinities of respective boundary portions between the upper wall parts 413, 413 and the side wall parts 412, 412 (ranges indicated by symbol B in FIG. 14(d)), balls X are disposed in spaces with the upper rails 42, 42 on inner surface sides thereof, and these balls X slide or roll relatively on inner surfaces of the boundary portions. In order for the balls X to slide or roll smoothly, the vicinities of the boundary portions desirably have flexibility of some degree. Therefore, preferably, the vicinities of the respective boundary portions between the upper wall parts 413, 413 and the side wall parts 412, 412 are not heat treated, or only outer surface sides in a thickness direction of the vicinities of the boundary portions (the ranges indicated by symbol B in FIG. 14(d)) are heat treated so that heat will not be transmitted to inner surface sides.

Figure 27:
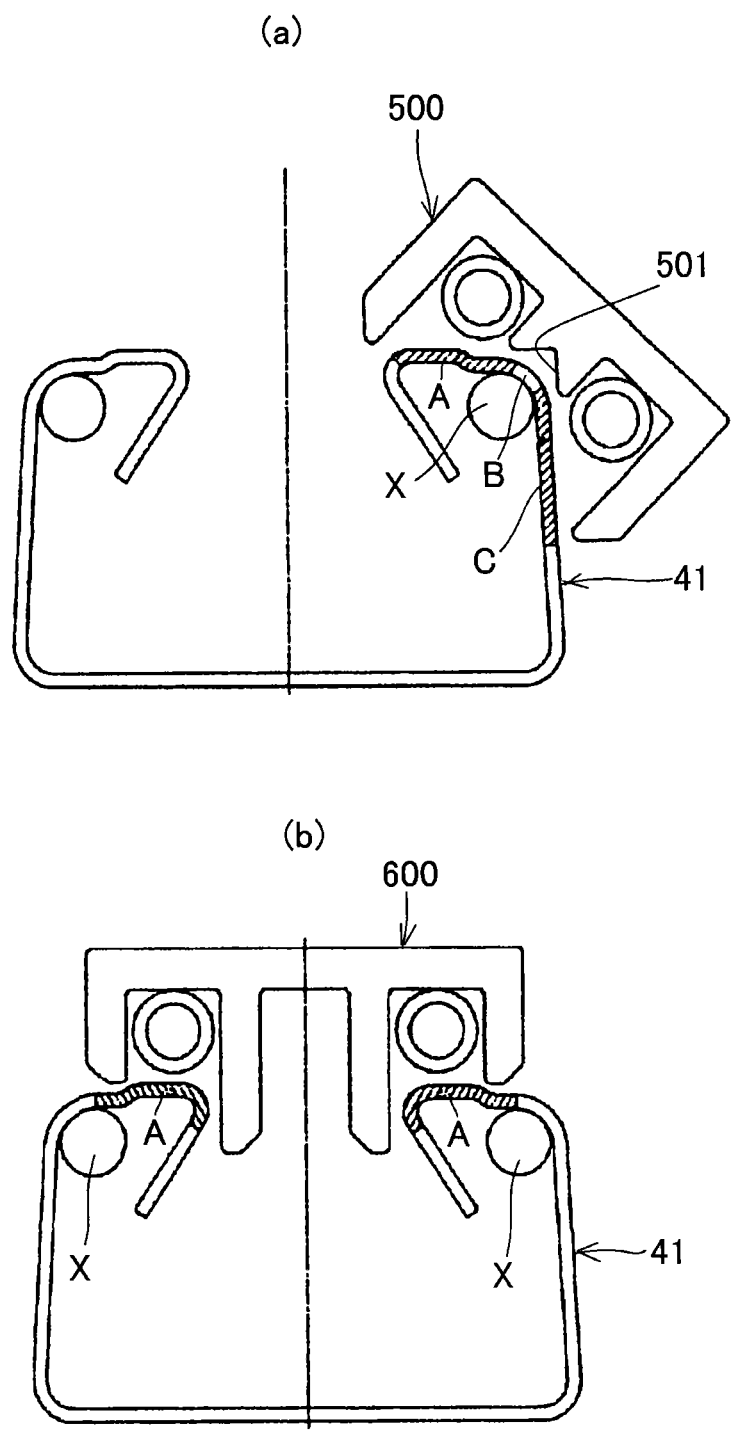
FIGS. 27(a), (b) are views illustrating examples of heat treatment jigs.

Note that when the ranges of symbols A and C excluding the ranges indicated by symbol B in FIG. 14(d) are heat treated, and when only an outer surface side is heat treated in the ranges indicated by symbol B and the ranges of symbols A and C are heat treated also on an inner surface side, the ranges of symbols A and C and so on can be heat treated sequentially with a heat treatment jig. However, by using a heat treatment jig having a shape and a size which can cover outside surfaces of symbols A, B, C on one side across the opposing edges between the upper wall parts 413, 413, and meanwhile being structured to form a depression for example in the range of symbol B making it difficult to transmit heat, only a desired position can be heat treated by a simple heat treatment step. FIG. 27(a) illustrates an example of such a heat treatment jig, in which a core part 500 has a size covering the ranges of symbols A, B, C, by which meanwhile a depression 501 is formed in a portion opposing the symbol B. Further, by using a heat treatment jig having a shape and a size which can cover outside surfaces of the ranges of symbols A, A on both sides across the opposing edges between the upper wall parts 413, 413, the ranges of symbols A, A on both sides can be heat treated at once. FIG. 27(b) illustrates an example of such a heat treatment jig, in which a core part 600 can cover the ranges of symbols A, A on both sides. Moreover, by using a heat treatment jig having a shape and size which can cover outside surfaces of symbols A, B, C on both sides across the opposing edges between the upper wall parts 413, 413, and meanwhile being structured to form a depression for example in the range of symbol B on both sides making it difficult to transmit heat, heat treated portions on both sides across the opposing edges between the upper wall parts 413, 413 can be heat treated at once, and thus efficiency can be increased further.

Further, in order to enhance rigidity, it is preferred to perform hemming of appropriate edges such as upper edges (parts indicated by symbol D in FIG. 14(c)) of the vertical wall parts 421, 421 of the upper rails 42, 42, outer edges (parts indicated by symbol E in FIG. 14(c)) of the upward oblique wall parts 423, 423, and/or the like.

Further, preferably, it is structured to be provided with retaining members 424, 424 having inclining surfaces between the vertical wall parts 421, 421 of the upper rails 42, 42 and portions located on both sides of the vertical wall parts 421, 421 in the horizontal wall parts 422, 422 (see FIG. 14(e)). Thus, when a force in a direction to disengage the upper rails 42, 42 from the respective lower rails 41, 41 operates, the inclining surfaces of the retaining members 424, 424 abut on the downward oblique wall parts 414, 414 of the respective lower rails 41, 41, and thus a deformation of the horizontal wall parts 422, 422 of the upper rails 42, 42 is suppressed, resulting in suppression of pulling off.

The vicinities of respective ends in the longitudinal direction of the lower rails 41, 41 are fixed to the floor via bolts or the like, and preferably, in the vicinities of at least one ends thereof, reinforcing plate-shaped members 415, 415 with a predetermined thickness are layered in at least one of the opposing pairs of side wall parts 412, 412 and upper wall parts 413, 413 (see FIG. 6 to FIG. 9, FIG. 12, FIG. 14). At the respective ends in the longitudinal direction, opposing edges of the upper wall parts 413, 413 easily open as compared to portions closer to the center than them, but by layering the reinforcing plate-shaped members 415, 415, a section modulus can be increased to make the opposing edges difficult to open. Further, preferably, the reinforcing plate-shaped members 415, 415 are provided in both ends in the longitudinal direction. Thus, the lower rails 41, 41 become substantially symmetrical also forward and backward with the substantially center part in the longitudinal direction being a boundary, allowing more efficient dispersion of a load applied to the lower rails 41, 41. However, when it is provided on either end, it is desired to be provided on the rear end side. The lower attaching part of the seat belt is provided on the rear end side. Therefore, when the occupant is largely displaced in a direction to spring forward at a time of impact, a force to pull the rear end side forward is applied by the seat belt. Accordingly, it is necessary to suppress particularly opening of the opposing edges on the rear end side. Further, the above-described high-rigidity parts by the heat treatment are preferably set to portions on both ends where the reinforcing plate-shaped members 415, 415 are not disposed, which makes the entire vicinities of upper parts (open cross section parts) in the longitudinal direction of the upper wall parts 413, 413 and the side wall parts 412, 412 of the lower rails 41, 41 become portions of high rigidity, allowing the entire lower rails 41, 41 to receive and disperse a load. Further, accordingly, a deformation of the easy deformation portion excluding the vicinities of the upper parts (open cross section parts) of the respective side wall parts 412, 412 also occurs in the entire longitudinal direction, and absorption of energy due to impact force or vibration, absorption of rattling or reduction of friction can be performed efficiently. In other words, the lower rails 41 and the upper rails 42 are structured to increase the section modulus in the vertical direction utilizing an input load in the upward and downward direction accompanying input of an impact force, thereby improving strength and rigidity. Thus, when an impact occurs and the person collides with the seat again, the weight of the person can be received with high rigidity, that is, the person can be received securely with structural members having a high section modulus in the vertical direction, improving protection performance for a person by the seat.

Figure 15:
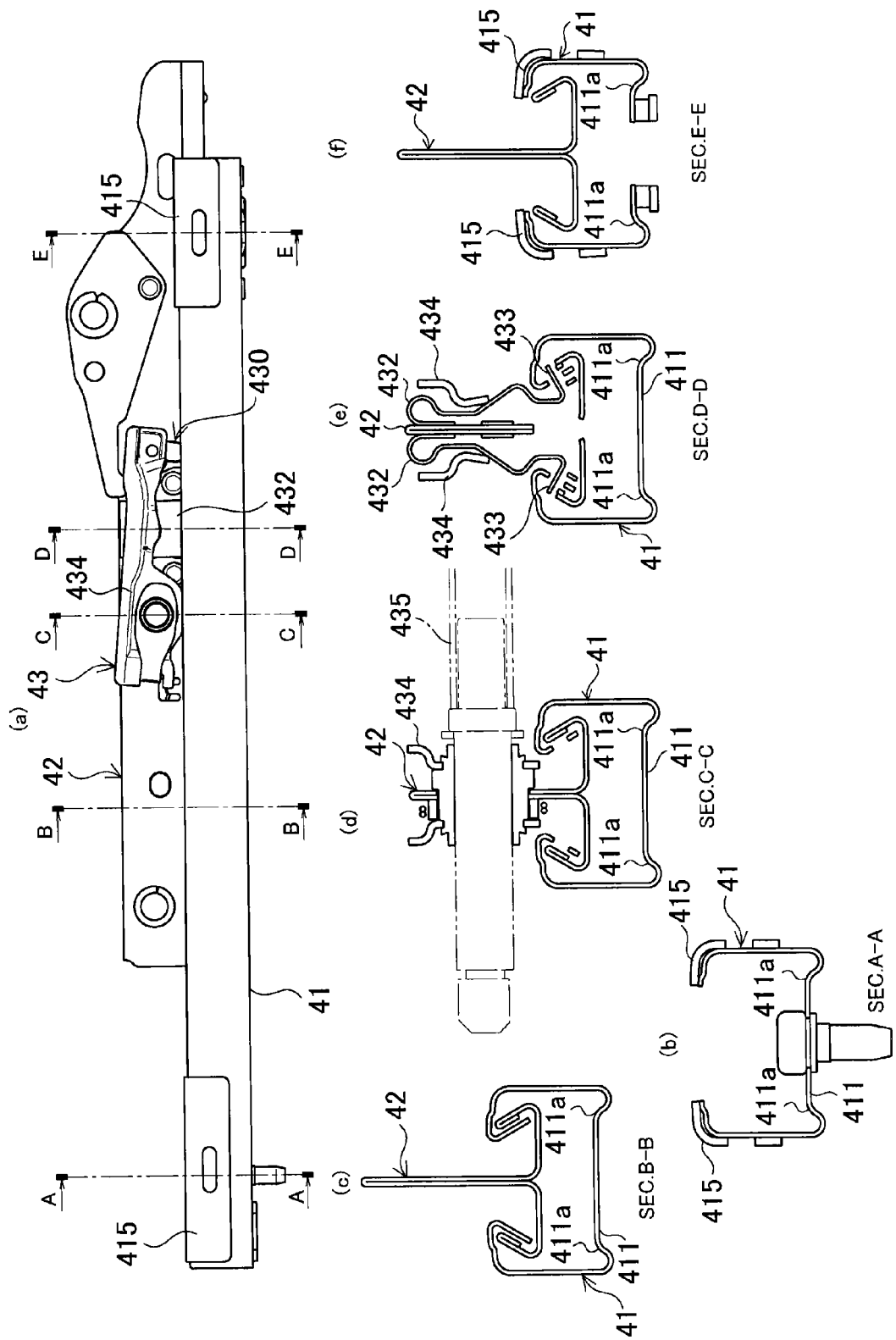
FIG. 15(a) is a side view illustrating an example of a mode in which a shape of a bottom wall part of a lower rail of the seat slide device is changed.
FIG. 15(b) is an A-A cross-sectional view of (a)
FIG. 15(c) is a B-B cross-sectional view of (a)
FIG. 15(d) is a C-C cross-sectional view of (a)
FIG. 15(e) is a D-D cross-sectional view of (a)
FIG. 15(f) is an E-E cross-sectional view of (a).
Figure 16:
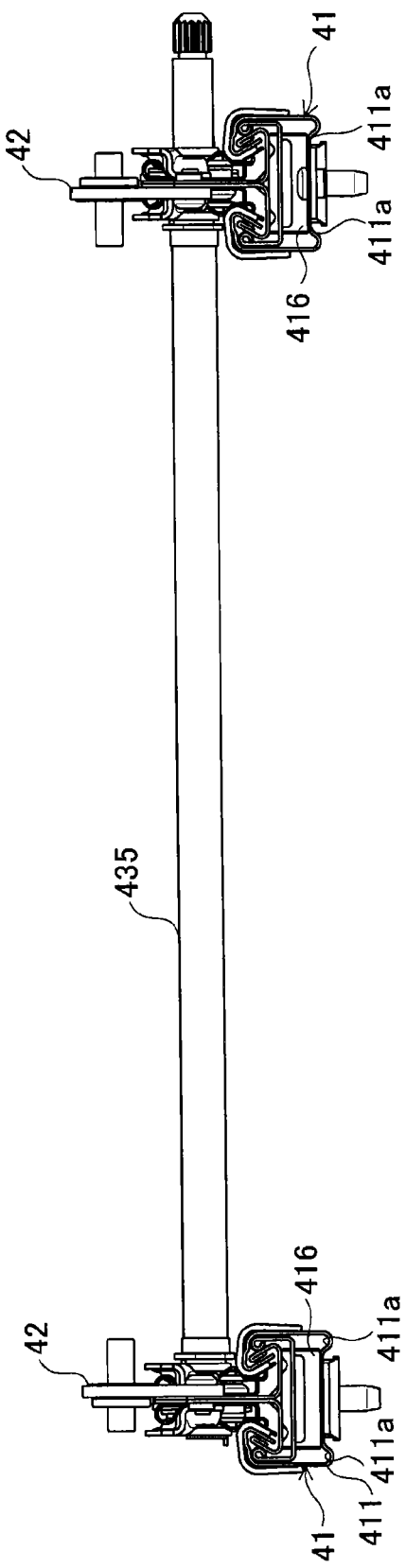
FIG. 16 is a rear view of a seat slide device according to a mode of FIG. 15.

In the vicinities of the respective ends of the lower rails 41, 41, rollers 416, 416 for sliding are supported. These rollers 416, 416 are disposed via retainers 417, 417 on bottom wall parts 411, 411 of the lower rails 41, 41. Here, since the bottom wall parts 411, 411 are formed of the thin material, when the bottom wall parts 411, 411 are flat surfaces, there is a concern that wear partially occurs relatively early due to insufficiency of surface pressure. Accordingly, as illustrated in FIG. 15, preferably, the bottom wall parts 411, 411 are structured to have stepped parts 411a, 411a such that, in a cross-sectional shape, a part protrudes upward with the vicinity of a corner on both ends in the width direction having an R-shaped cross-section. Thus, as illustrated in FIG. 16, the rollers 416, 416 are consequently supported on these stepped parts 411a, 411a. The rollers are consequently supported by portions inclined in an obliquely upward and downward direction (vertically long cross-sectional portions) when seen in a cross-section of the stepped parts 411a, 411a, and thus wear is difficult to occur. Note that such partial wear occurs by the rollers 416, 416 as described above, but in this embodiment, the lock mechanism 43 has the elastic lock member 430, which gives elasticity to the lower rails 41, 41 and the upper rails 42, 42. Therefore, even when the aforementioned partial wear occurs, the lower rails 41, 41 and the upper rails 42, 42 bend by an elastic deformation, and thus it is difficult for the seated person to feel rattling by this partial wear.

According to the present invention, a force applied to the seat cushion part 1A and the seat back part 1B is transmitted to the upper rails 42, 42 and the lower rails 41, 41 of the seat slide device 40 via the cushion frame 20 and the back frame 30, but since the upper rails 42, 42 and the lower rails 41, 41 are both formed to be substantially symmetrically bilaterally across a center line in the longitudinal direction (line passing through a center in a cross-sectional shape orthogonal to the longitudinal direction), the force operates substantially evenly left and right to the respective members. Therefore, a deformation when an impact force is applied attempts to occur substantially evenly on the left and right, and hence a material thinner than conventional ones can be used as the material constituting the lower rails 41, 41 and the upper rails 42, 42, which is suitable for achieving weight reduction. On the other hand, by forming the high-rigidity parts at predetermined positions, the lower rails 41, 41 have a structure such that the opposing edges in the upper wall parts 413, 413 are difficult to open when a predetermined impact force or more operates in a direction in which the upper rails 42, 42 are pulled out. Therefore, when the impact force operates, the upper rails 42, 42 do not disengage from the lower rails 41, 41, and hence the easy deformation portions set in the lower rails 41, 41 as a portion of relatively low rigidity deform. In conventional seat slide devices, as both the upper rails and lower rails, one which has a large thickness and high rigidity and does not deform itself as much as possible is employed. But according to this embodiment, the lower rails 41, 41 deform in a state of retaining the upper rails 42, 42, the ability to absorb an impact force and energy, for which the seat slide device 40 is responsible, is higher than conventional ones. Note that the lower rails 41, 41 and the upper rails 42, 42 are preferred to be formed substantially symmetrically as much as possible also in front and rear in the longitudinal direction, by which a load can be dispersed in the entire longitudinal direction as described above.

Further, the lock mechanism 43 has the elastic lock member 430, and the attaching plate part 431 of the elastic lock member 430 is supported on the upper rails 42, 42. Then, the lock claws 433 formed on the operating plate part 432 of the elastic lock member 430 engage with the engaged parts of the upper rails 42, 42. Therefore, elasticity of the elastic lock member 430 operates on the upper rails 42, 42 and the lower rails 41, 41. That is, the elastic lock member 430 with high yield stress becomes an elastic fulcrum and elasticity thereof operates on the lower rails 41, 41 and the upper rails 42, 42, and thus the lower rails 41, 41 and the upper rails 42, 42 are substantially elastically deformable by which absorption of vibration or impact force, absorption of rattling or reduction of friction can be achieved. In this embodiment, in particular, the upper rails 42, 42 and the lower rails 41, 41 are formed of the thin material with a predetermined thickness or less, and the high-rigidity parts are provide in the predetermined portions as described above. Further, the reinforcing plate-shaped members 415, 415 are layered on both ends of the lower rails 41, 41. Therefore, the reinforcing plate-shaped members 415, 415 on both ends and the high-rigidity parts become what are called support parts, and elasticity of particularly the elastic lock member 430 operates on other portions, including the easy deformation portion, which are easily deformable relative to the support parts. Thus, the upper rails 42, 42 and the lower rails 41, 41 consequently function as an elastic member in their entirety, and has a high effect to absorb a biased load applied to the elastic lock member 430, the upper rails 42, 42, and the lower rails 41, 41 while elastically deforming. Further, these members elastically deform corresponding to a vibration input, and thus the upper rails 42, 42 and the lower rails 41, 41 consequently exhibit a function as a vibration absorbing member, which contributes to improvement in vibration absorbing characteristic of the entire vehicle seat 1 including the seat slide device 40.

Further, by functioning like an elastic member in their entirety, when there is a manufacturing error in the both, or when partial wear as described above occurs in the lower rails 41, 41, the upper rails 42, 42 and the lower rails 41, 41 can absorb them by an elastic deformation to reduce rattling and friction loss, and realize smooth movement. Note that preferably the elastic lock member 430 is provided in a substantially center part in the longitudinal direction of the upper rails 42, 42 so as to be the above-described elastic fulcrum for the upper rails 42, 42 and the lower rails 41, 41 to efficiently exhibit elasticity. That is, the substantially center part in the longitudinal direction of the upper rails 42, 42 becomes the center of the elastic deformation, and thus operations such as absorption of a biased load, reduction of friction, absorption of vibration, absorption of impact force, and the like are performed smoothly without any bias.

Figure 17:
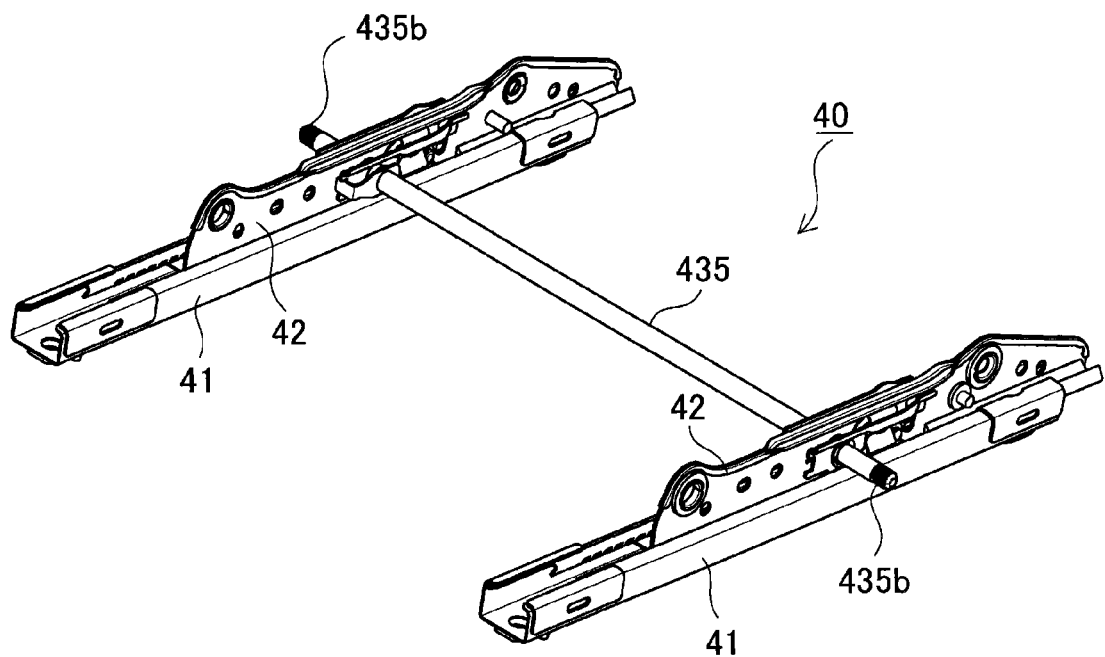
FIG. 17 is a perspective view illustrating a seat slide device in a mode in which operating parts are provided on both ends of a coupling shaft.
Figure 18:
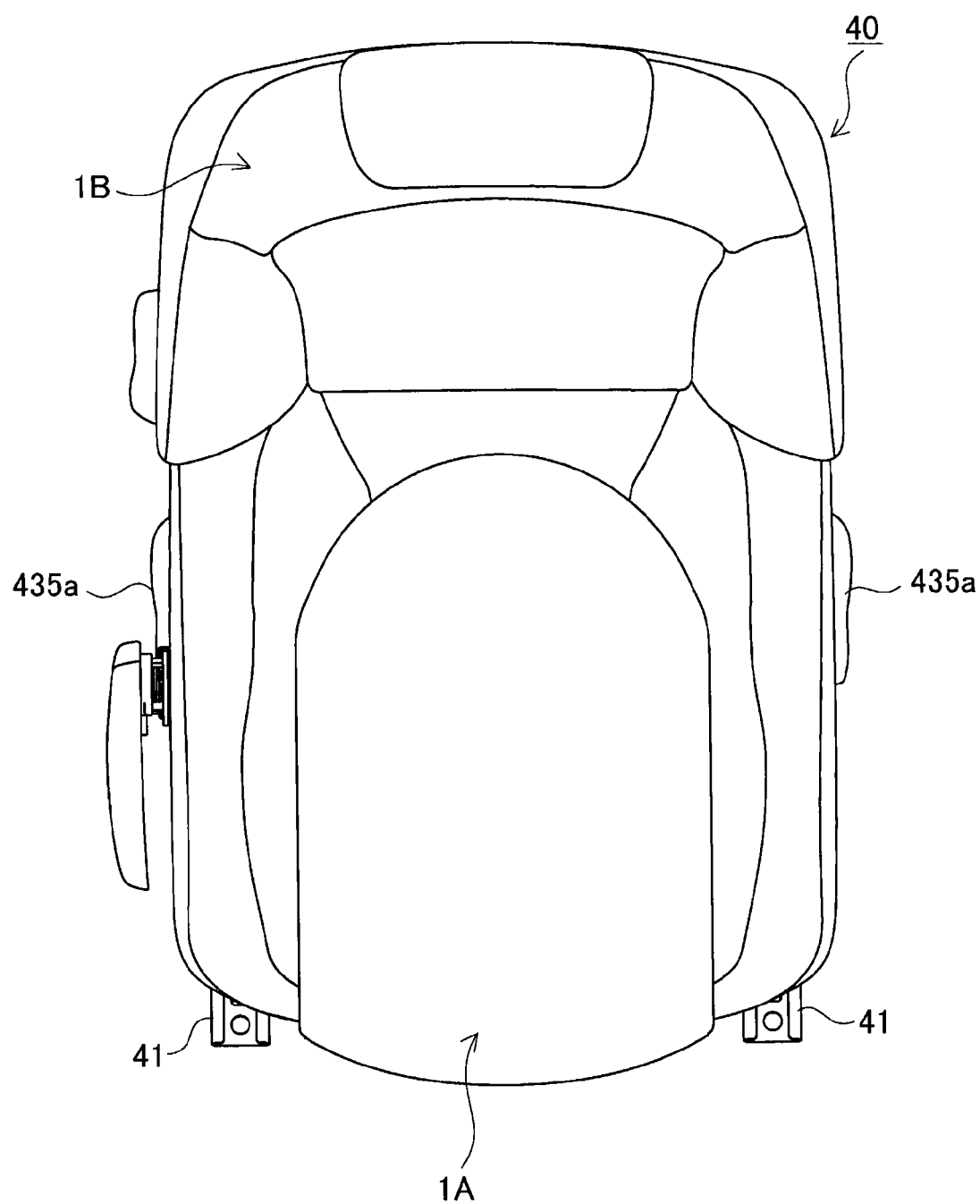
FIG. 18 is a plan view of a vehicle seat provided with operating parts on both ends of the coupling shaft.
Figure 19:
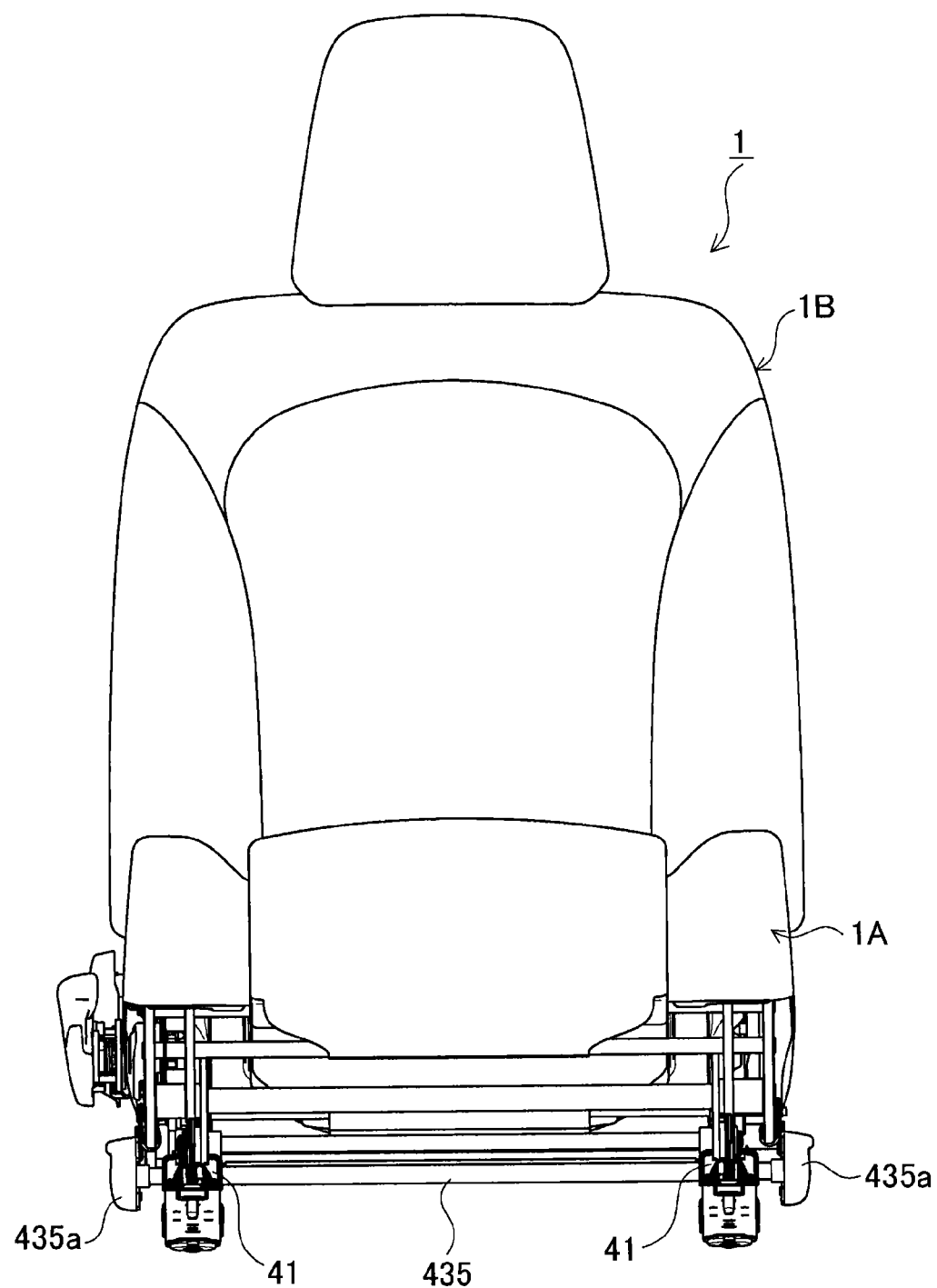
FIG. 19 is a front view of FIG. 18.

Note that in the above embodiment, the operating part 435*a* is coupled to only one end of the coupling shaft 435, but as illustrated in FIG. 17 to FIG. 19, it can be structured such that ends 435*b*, 435*b* of the coupling shaft 435 are made to project on both the left and right sides, and operating parts 435*a*, 435*a* are provided on both the ends 435*b*, 435*b*. In this structure, the seat slide device 40 has exactly the same structure for both the driver's seat and the front passenger's seat, and thus can be used for either of the seats. Further, since the operating parts 435*a*, 435*a* are provided on both the ends, it becomes also easy to release the lock of the front passenger's seat from the driver's seat. Further, such commonalization unifies assembly steps, by which a production amount can be increased easily. Also, the assembly steps can be simplified with the same structure, and thus misassembly or forgetting assembly of parts are reduced, and inspection steps are simplified, consequently contributing to reduction in manufacturing costs. Further, when it is in use, the seated person can operate by either of the left and right hands, making it easy to operate.

Also, an operating direction of the operating parts 435*a* is not limited. This is the same in either case of the mode illustrated in FIG. 1 to FIG. 16 and the mode illustrated in FIG. 17 to FIG. 19. By an attaching direction of the operating parts 435*a* to the coupling shaft 435, it can be structured such that the lock is released by pushing down a rear part of the operating parts 435*a* as illustrated in FIG. 20(*a*), or structured such that the lock is released by operating a front part of the operating parts 435*a* upward as illustrated in FIG. 20(*b*). The seat slide device 40 can be arranged appropriately according to the type of the vehicle in which it is installed, or the operating direction can be adjusted according to the user's preference.

Note that the lower rails 41, 41 used in the above embodiment are elastically deformable by operation of elasticity of the elastic lock mechanism 43, but the lower rails 41, 41 themselves can be formed of a spring steel. Also in this case, vibration absorbing, absorption operation of impact force, and so on similar to above ones can function, but by forming the lower rails 41, 41 themselves from a spring steel, setting of the high-rigidity parts to be a fulcrum of elastic deformation and the reinforcing plate-shaped members can be made unnecessary, making the structure more simple. As the spring steel in this case, for weight reduction it is preferred to use a thin material with a plate thickness in the range of 1.0 mm or less, preferably in the range of 0.6 to 1.0 mm. Further, it is also possible to use a high-tensile steel of 780 MPa or more as the lower rails 41, 41. In this case, by using the thin material with a plate thickness in the range of 1.0 mm or less, preferably in the range of 0.6 to 1.0 mm, the above-described elasticity of the elastic lock member can be operated. Further, by using such a high-tensile steel, the above-described heat treatment step for the open cross section part can also be omitted.

Further, as described above, the lower rails 41, 41 are preferred to be structured such that the bottom wall parts 411, 411 have, rather than a flat surface, a part having an R-shaped cross-section formed in the vicinity of a corner on both ends in the width direction to have the stepped parts 411*a*, 411*a* projecting upward on both sides in the width direction, because even when they are formed of the thin material, when a load is applied via the rollers 416, 416 it is consequently supported by portions inclined in an obliquely upward and downward direction (vertically long cross-sectional portions) of the stepped parts 411a, 411a, and thus wear is difficult to occur. Further, the rollers 416, 416 are preferably formed to be substantially the same as the width (length in a direction along an axial center of the rollers 416 themselves) corresponding to the interval between the stepped parts 411a, 411a, or slightly wider than that. On the other hand, in addition to the stepped parts 411a, 411a and the parts 411b, 411b having an R-shaped cross-section in the vicinity of a corner on both ends in the width direction, as described in FIG. 21(a), the lower rails 41, 41 are preferred to be press formed into a shape in which a tensile force operates to make substantially center parts 411c, 411c in the width direction of the bottom wall parts 411, 411 of the lower rails 41, 41 have a shape expanding upward.

Thus, when a load is applied downward by the weight of the occupant, as illustrated in FIG. 21(b), a deformation occurs in a direction to lower positions of the substantially center parts 411c, 411c via the upper rails 42, 42 and the rollers 416, 416 and make the bottom wall parts 411, 411 flat. When this deformation occurs, since rigidity of the parts 411b, 411b having an R-shaped cross-section and the stepped parts 411a, 411a is relatively high, the side wall parts 412, 412 deform in a direction in which the upper wall parts 413, 413 of the lower rails 41, 41 close. Since the positions of the upper rails 42, 42 lower slightly, the balls X consequently contact with portions closer to upper portions of the upward oblique wall parts 423, 423 of the upper rails 42, 42 in the state of FIG. 21(b) than in the state of FIG. 21(a). Accordingly, since the upward oblique wall parts 423, 423 are inclined inward, a pressing force to the balls X becomes slightly weak, the balls X become easy to roll, friction is reduced, and sliding of the upper rails 42, 42 becomes more smooth. Therefore, with this structure, when sliding forward or backward is performed in a state that the occupant is riding, accompanying an elastic deformation of the cross-sectional shape of the lower rails 41, 41, friction with the balls X becomes rolling friction and thus they are easily movable in a sliding direction. When a force is further inputted in the upward and downward direction, the cross-sectional shapes of the lower rails 41, 41 move as if breathing, a concentrated load to one point becomes a dispersed load to multiple points, and thus it becomes a structure in which a surface pressure is dispersed and wear does not occur easily. Specifically, normally a Coulomb force increases accompanying increase in load mass, but this structure has a characteristic such that, since rolling friction occurs as described above by input of a load, the Coulomb force becomes small by the increase in load mass. Note that by this structure there is an advantage that friction during sliding can be made small by using a slider made of synthetic resin instead of the balls X.

On the other hand, when a load applied to the upper rails 42, 42 becomes small, the bottom wall parts 411, 411 of the lower rails 41, 41 attempt to restore to the shape in which the substantially center parts 411c, 411c expand. Therefore, by the structure applying such a tensile force to the bottom wall parts 411, 411 of the lower rails 41, 41, this restoring force can operate with respect to inputs of a large load and repetitive loads to prevent rattling and wear, and thereby high durability can be exhibited even with the thin material.

Therefore, in the structure of this embodiment, as described above, when sliding forward or backward is performed in a state that the occupant is riding, an elastic deformation of the cross-sectional shape of the lower rails 41, 41 causes a change in clearance between the lower rails 41, 41 and the upper rails 42, 42, friction with the balls X thereby becomes rolling friction and thus they are easily movable, and resistance in a sliding direction can be suppressed very low. In FIG. 22, sliding forward and backward was performed and a sliding force thereof was studied in a state that the cushion frame unit is supported on the seat slide device 1 of the embodiment having a cross section illustrated in FIG. 21, with respect to the case where the relation between the lower rails 41 and the upper rails 42 of the slider are in a state of FIG. 21(a) (state that the substantially center parts 411c in the width direction of the bottom wall part 411 of the lower rail 41 expands upward), and the case where a weight of 60 kg is mounted on the cushion frame unit and the relation between the lower rails 41 and the upper rails 42 of the slider is in a state of FIG. 21(b) (state that the bottom wall part 411 of the lower rails 41 is bent and flat). Note that the lower rails 41 and the upper rails 42 constituting the seat slide device 1 of this embodiment used here are both steel materials with a thickness of approximately 1.0 mm and tensile strength of 590 MPa. Further, the elastic lock member 430 of the lock mechanism 43 uses a spring steel with a thickness of 0.8 mm. In FIG. 22, a slide position in the horizontal axis indicates a separation distance of sliding forward and backward from an intermediate position (0 mm) of a slidable length of the upper rails 42 with respect to the lower rails 41, and a slide force is a force at each measuring point where it is applied for sliding the upper rails at a constant speed relative to the lower rails. The slide force when the weight of 60 kg was not mounted was between approximately 16 and 19 N, but when the weight of 60 kg was mounted, the slide force was approximately 6 to 12 N, where the friction resistance while sliding was largely reduced. Therefore, as described above, while sliding is smooth when the occupant is sitting on, the substantially center parts 411c in the width direction restore in the expanding direction when the load becomes small, and hence it can be seen that rattling and wear can be prevented.

Figure 22:
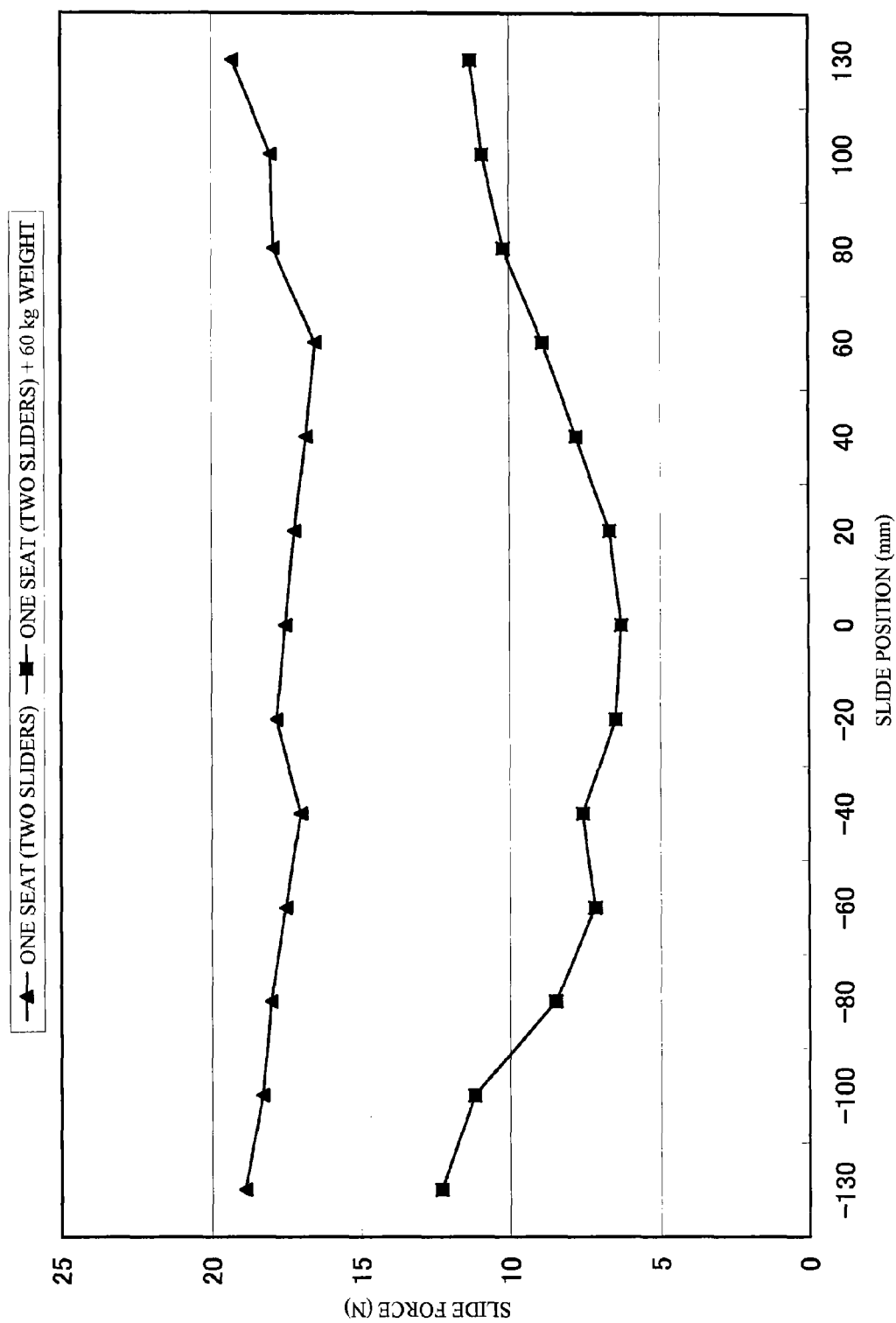
FIG. 22 is a diagram illustrating slide forces of sliders of FIG. 21.
Figure 23:
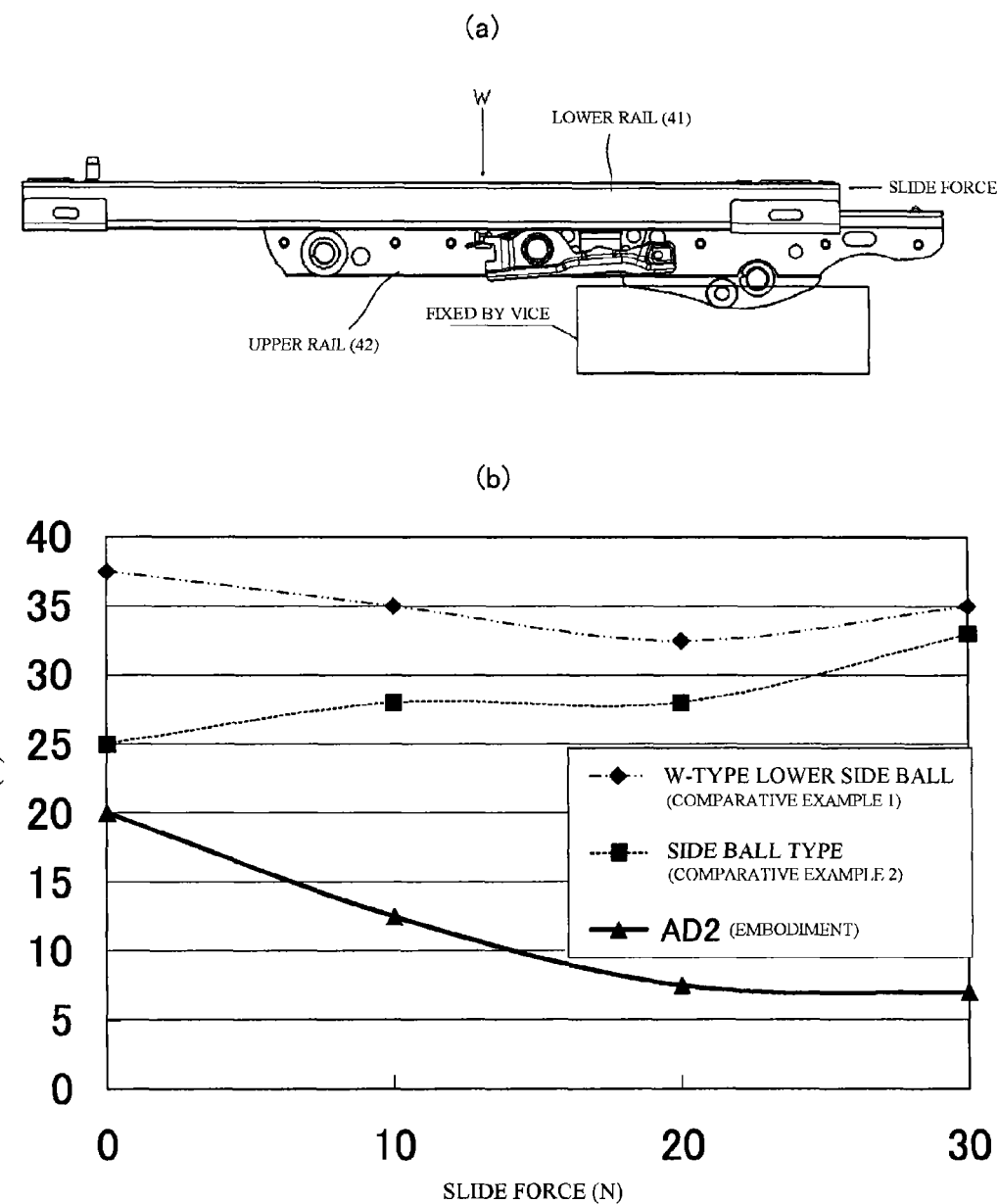
FIG. 23(a) is a view for explaining a test method of slide forces of the seat slide device according to the embodiment and seat slide devices according to comparative examples.
FIG. 23(b) is a diagram illustrating test results thereof.
Figure 26:
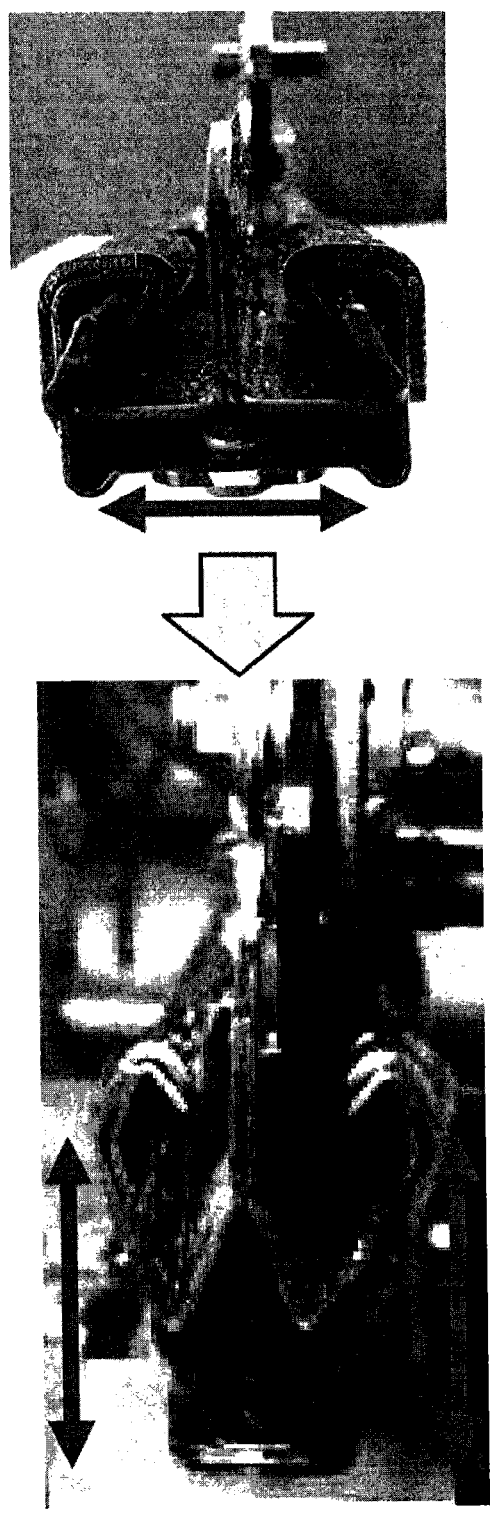
FIG. 26 is a view illustrating cross-sectional shapes of a slider when the experiment simulating a front collision was performed.

Decrease in slide force (decrease in sliding resistance at a time of slide) was further measured as in FIG. 23. As illustrated in FIG. 23(a), the upper rail 42 was fixed on a vice so that the lower rail 41 is on an upper side, a weight was mounted on a rear surface of this lower rail 41, the lower rail 41 was moved relative to the upper rail 42, and a slide force when there is one slider was measured. A slide force was measured at a predetermined measuring position in each of a state that no weight is mounted on the lower rail 41 (0 kg), a state that a weight of 10 kg was mounted, a state that a weight of 20 kg was mounted and a state that a weight of 30 kg was mounted. Results are presented in FIG. 23(b). In the diagram, "embodiment" denotes data of a slider on one side of the seat slide device 1 used in the test of FIG. 22. "Comparative example 1" and "comparative example 2" denote data of sliders on one side of seat slide devices employed in commercially available cars. Note that for the seat slide device of comparative example 1, the lower rail and the upper rail are formed of a high-tensile steel with tensile strength of 980 MPa and a plate thickness of approximately 1.4 mm, in which one formed of an ordinary steel with tensile strength of 590 MPa and a plate thickness of about 2.3 mm is used as the lock member of the lock mechanism, and for the seat slide device of comparative example 2, the lower rail and the upper rail are formed of an ordinary steel with tensile strength of 590 MPa and a plate thickness of about 1.8 mm, and one formed of an ordinary steel with tensile strength of 590 MPa and a plate thickness of about 2.3 mm is used as the lock member of the lock mechanism. Further, either of comparative example 1 and comparative example 2 does not have the parts 411b having an R-shaped cross-section on both sides of the bottom wall part 411 of the lower rail 41 as in this embodiment, and has a shape in which the substantially center part 411c in a cross section does not expand upward. Further, comparative example 1 is structured such that it has a cross-sectional shape of W in which balls for sliding are disposed on side faces of the lower rail, and comparative example 2 is structured such that it has a cross-sectional shape of W in which balls for sliding are disposed on bottom faces of the lower rail.

As illustrated in FIG. 23(b), in this embodiment, the slide force decreases as the weight gets heavier such as 10 kg, 20 kg, 30 kg, whereas comparative example 2 increases in slide force as the weight gets heavier. First, in the case of comparative example 2, since the plate thickness of the lower rail and the upper rail is thick, a yield point of material is low and resistance in the slide direction changes due to a clearance with balls located between the both. Further, in either case, it is a structure such that the balls for sliding are provided to be located in trenches formed in a longitudinal direction of the lower rail or upper rail, and their positions in the cross-sectional direction do not change by relative movement of the lower rail and the upper rail. Specifically, in this embodiment, positions of the balls X in the cross-sectional direction change accompanying a load change as described above (see FIG. 21) and resistance in the slide direction is reduced, but such a thing would not occur in comparative example 2. Thus, the friction resistance increases accompanying increase in load, and resistance in the slide direction increases. On the other hand, comparative example 1 uses a high-tensile steel as the lower rail and the upper rail. The point that the positions of the balls for sliding do not change by a load is the same as in comparative example 2, but since the high-tensile steel is used, it attempts to absorb a load fluctuation by elasticity of a vertical wall part of the upper rail and side wall parts of the lower rail. Accordingly, the slide force of comparative example 1 does not have load dependency like comparative example 2 does, and is almost constant when the weight increases. However, since it is not a structure in which the cross-sectional shape of the lower rail 41 changes as in this embodiment (the bottom wall part 411 changes from an expanded shape to a flat shape as described above), a phenomenon that resistance in the slide direction decreases accompanying a load increase does not occur. Therefore, it can be seen that in this embodiment, as compared to the comparative examples, the occupant can perform a slide operation with a light force while remaining in a seated state.

In this embodiment, the lower rails 41 are formed of the thin material as described above, also the portions 411b having an R-shaped cross-section are provided on both sides of the bottom wall parts 411 of the lower rails 41, preferably the substantially center parts 411c in a cross section therebetween have a shape expanding upward, and in addition to the balls X disposed between the upper rails 42 and the lower rails 41, the rollers 416 are disposed in the bottom wall parts 411 of the lower rails 41. Accordingly, as described above, the slide force is significantly low as compared to a general seat slide device.

Further, in this embodiment, the lock mechanism 43 has the elastic lock member 430 constituted of a thin spring steel. This elastic lock member 430 is such that the operating plate part 432 and the lock claws 433 are formed integrally on the attaching plate part 431 to the upper rail 42 as described above, and the lock claws 433 engage with engaged parts 414a constituted of holes or trenches formed in the lower rail 41. Specifically, the operating plate part 432 is biased in a direction to depart from the attaching plate part 431, and the lock claws 433 are constantly biased in a direction to engage with the engaged parts 414a. However, this biasing force of the lock claws 433 is due to that the elasticity operates on the operating plate part 432 in the direction to depart from the attaching plate part 431 formed integrally. If the operating plate part 432 having the lock claws 433 is not formed integrally with the attaching plate part 431, in order to bias the operating plate part 432 and the lock claws 433, for example, a shaft member is provided on a base end portion of the operating plate part 432, and a spring member for further biasing this shaft member by rotating is needed separately. As a result, resistance in the mechanical part for biasing the operating plate part 432 and the lock claws 433 generates structural damping. However, in the case of this embodiment in which the operating plate part 432 and the lock claws 433 are integrally formed with the attaching plate part 432, such structural damping will not be generated, and thus an engaging operation of the lock claws 433 by restoring force of the operating plate part 432 is performed quickly without any loss. Thus, when the lock claws 433 reach the positions of the corresponding engaged parts 414a, they are quickly biased in the engaging direction, and it is quite rare to become a pseudo-lock (or half lock) state of being stuck incompletely.

Further, since the elastic lock member 430 is thin, elasticity operates to the operating plate part 432 and the lock claws 433 in the forward and backward direction thereof, and the lock claws 433 bend easily. Thus, at a time of locking, the lock claws 433 can easily enter the engaged parts 414a while accompanied by bending, and this operation also helps to suppress the pseudo-lock.

Further, in this embodiment, since the operating plate part 432 of the elastic lock member 430 attempts to open, the lock release member 434 is biased by this in a direction to pivot up and down about one end (see FIG. 14 and FIG. 15), and at a time of releasing locking it is pivoted downward to press the expanding part 432a, but at a time of locking it pivots upward to return to its original position when the operating hand is released. At this time, by using thin one also as the lock release member 434, inertial moment becomes small, and the rotation speed increases, helping to prevent the rotation movement from stopping at an incomplete position of the above-described pseudo-lock state. Therefore, as the member constituting the lock release member 434, preferably, one with a plate thickness of 1.8 mm or less, preferably one with a plate thickness in the range of 0.6 to 1.6 mm, more preferably one with a plate thickness in the range of 0.6 to 1.2 mm, furthermore preferably one with a plate thickness in the range of 0.6 to 1.0 mm is used.

Figure 21:
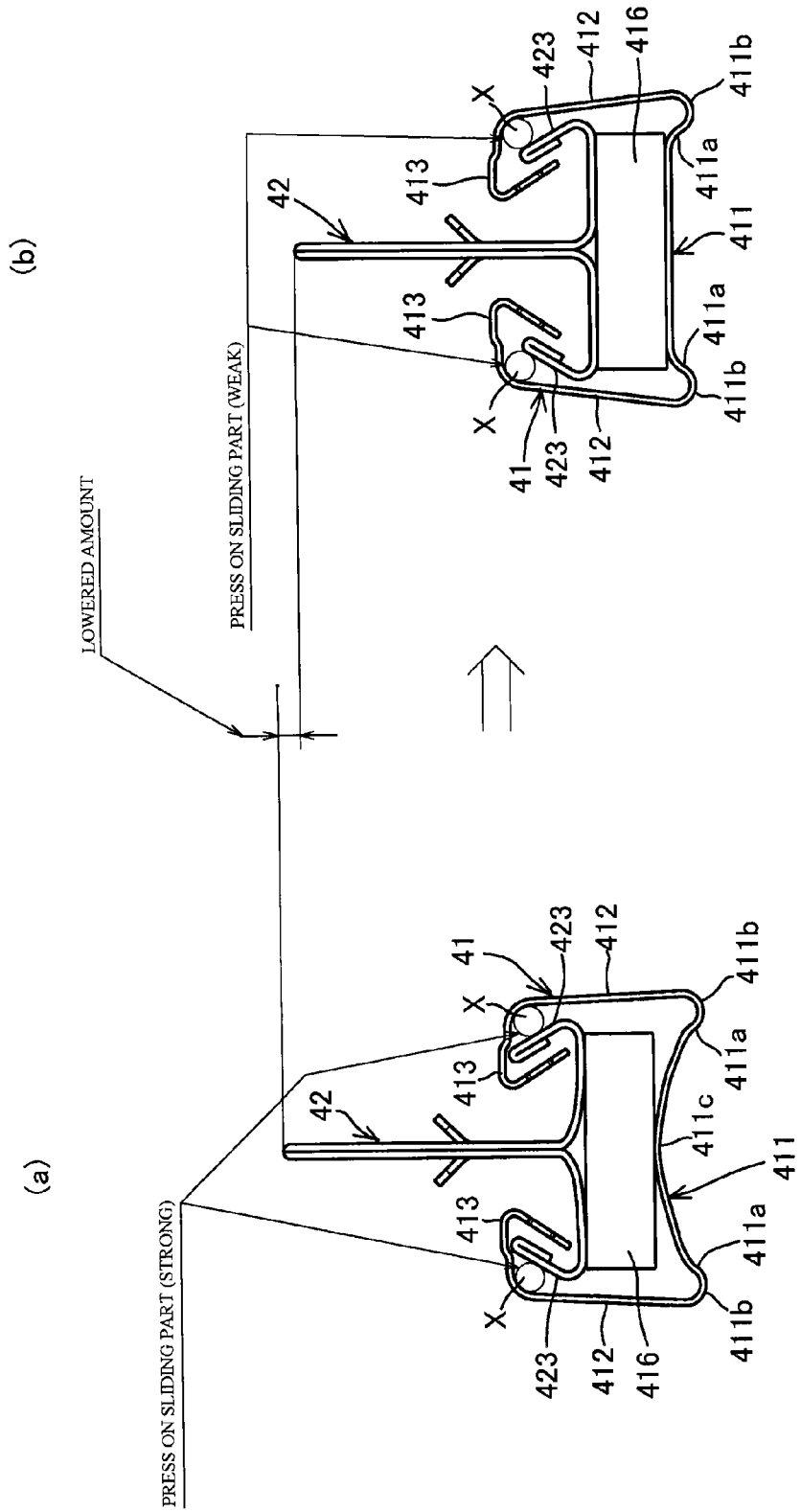
FIG. 21(a) is a view illustrating a mode of giving a bottom wall part of a lower rail a tensional force which makes a substantially center part in a width direction expand.
FIG. 21(b) is a view illustrating a state that a predetermined load is applied.

Due to that the above-described slide force (friction resistance at a time of slide) is small, that the lock mechanism 43 is provided with the elastic lock member 430 constituted of a spring steel and engagement of the engaged parts 414a of the lock claws 433 is quickly performed, and further that a displacement in the forward and backward direction can be absorbed by the thin operating plate part 432 and the lock claws 433, and so on, the seat slide device 1 (one in which a cross-sectional shape of the lower rail 41 is similar to FIG. 21) of this embodiment basically has a structure which infrequently becomes the pseudo-lock (or half lock) state that the lock claws 433 could not enter the engaged parts 414a and become stuck incompletely, and if such a pseudo-lock state had occurred, it has a characteristic that the pseudo-lock state is quickly eliminated by vibrations from the floor or a slight forward or backward movement of the occupant, or the like. To clarify this point, while the lock claws 433 are brought in advance into a state of not engaging with the engaged parts 414a constituted of holes or trenches of the lower rail 41, that is, the lock claws 433 are located between adjacent engaged parts 414a, 414a, a test was carried out on whether or not the lock claws 433 engage with the engaged parts 414a and be locked when vibrations are applied or when a person sits down.

A car seat was supported on the seat slide device 1 and then it was set on a surface plate of a vibrator as illustrated in FIG. 24(a), so as to carry out the test. Results thereof are in FIGS. 24(b) to (e), and among them, FIGS. 24(b) to (d) give test results of three seat slide devices of this embodiment constituted similarly to that used in the tests of FIG. 22 and FIG. 23, and FIG. 24(e) gives test results of comparative example 1 of FIG. 23. "Vertical vibration application" describes data when vibrations are inputted in the upward and downward direction by 3 to 17 Hz. "Slide angle" describes an inclination angle (set to 0°, 3°, 6°) of the lower rail 41. "G" describes input acceleration (set to 0.1, 0.3, 0.5), and weight describes the weight (20 kg, 40 kg, 60 kg) mounted on the seat cushion. "Normal seating" describes test results when a person sits on the seat cushion, "under buttocks=50" describes results of the case of sitting on quietly from the position at a distance of 50 mm from the buttocks to the seat surface, "under buttocks=100" describes results of the case of sitting on quietly from the position at a distance of 100 mm from the buttocks to the seat surface, and "under buttocks=150" describes results of the case of sitting on quietly from the position at a distance of 150 mm from the buttocks to the seat surface. Further, FIG. 25 illustrates by summarizing the case where the pseudo-lock state was eliminated and a normal lock state was achieved, and the case where the pseudo-lock state was not eliminated and a normal lock state was not achieved in the test of vertical vibration.

First, in the results of "vertical vibration", in the case of the embodiments, as illustrated in FIGS. 24(b) to (d) and FIG. 25, when G=0.3 and G=0.5, the lock claws 433 normally locked in the engaged parts 414a and the pseudo-lock was eliminated in all the cases when a weight of 20 to 60 kg was applied at any of the slide angles. Further, as illustrated in FIGS. 24(b) to (d), when G=0.1, the pseudo-lock was mostly eliminated at the slide angle of 3° or more. Also, by calculation of resonance frequency ID=1/(2π√(m/k), the frequency at a time the pseudo-lock is eliminated was a value less than a resonance point for all of them.

In the case of comparative example 1, as illustrated in FIG. 24(e) and FIG. 25, the pseudo-lock was eliminated only in the cases of 40 kg weight and 60 kg weight and in four examples under the conditions of acceleration G=0.3 and G=0.5, and slide angle of 6°. In FIG. 24(e), frequency described under the conditions of G=0.1, weight of 40 kg and 60 kg, and slide angle of 3° and 6°, frequency described under the conditions of G=0.3, weight of 40 kg and 60 kg, and slide angle of 3°, frequency described under the conditions of G=0.5, weight of 40 kg, and slide angle of 3°, and frequency described under the conditions of G=0.5, weight of 60 kg, and slide angles of 0° and 3° are values all equal to or more than a resonance frequency. That is, FIG. 24(e) indicates that the pseudo-lock is eliminated at a predetermined frequency under these conditions, but all the frequencies at the time of elimination are equal to or more than the resonance frequency, and the pseudo-lock was eliminated because the weight was largely displaced up and down by resonance, that is, an external force equal to or more than the vibrations inputted from the floor was applied. Thus, in FIG. 25, these conditions are presented as the case where the pseudo-lock is not eliminated.

In the test of "normal seating", in this embodiment of FIG. 24(b) to (d), the seat slide device became the lock state under all the conditions, but in comparative example 2 of FIG. 24(e), there are cases where it was not locked when the distance from the buttocks to the seat surface is 50 mm (under buttocks=50) and 100 mm (under buttocks=100) and the slide angle is 0°.

From these, it was recognized that in this embodiment, the seat slide device is quickly locked when there is a slight vibration input from the floor or a slight change of force at a time of seating or the like, and hence has a characteristic of being difficult to become the pseudo-lock state. That is, in a state that the lock claws 433 are located between adjacent engaged parts 414a, 414a constituted of holes or trenches of the lower rail 41, since the lock claws 433 are quite thin as compared to conventional ones, the contact area between the both is small and hence friction resistance between the both is small, and since the operating plate part 432 and the lock claws 433 are formed integrally with the attaching plate part 431 constituted of a spring steel, elasticity in a direction to engage the lock claws 433 with the engaged parts 414a operates without loss by structural damping, and the upper rail 42 displaces in a direction to quickly eliminate this pseudo-lock state when there is a slight change in force, thereby achieving a normal lock state.

FIG. 25 is a diagram illustrating changes in cross-sectional shape of sliders when a simulation experiment of a front collision is performed by simultaneously applying a load of approximately 15 kN forward to each of a shoulder strap and a lap strap of the seat belt of the above-described vehicle seat 1, and by applying a load of about 20 times the seat weight obliquely forward and downward to the barycentric position of the seat cushion part. As compared to before the experiment, in the lower rails 41 to which elasticity is given as described above, the corner portion of the bottom wall parts 411 and the side wall parts 412 and the corner portions of the side wall parts 412 and the upper wall parts 413 deform to extend in the vertical direction, and it is closer to flat. On the other hand, in the upper rails 42, the horizontal wall parts 422 deform in a direction to be slightly vertical from horizontal but are not pulled out of the lower rails 41 and stay therein. That is, by such deformations of the lower rails 41 and the upper rails 42, energy by an impact force can be absorbed despite that it is of a thin plate and light weight.

INDUSTRIAL AVAILABILITY

The seat slide device of the present invention is preferred to be used in an automobile as described in the above embodiment, but also applicable to various types of vehicle seats for aircrafts, trains, boats and ships, buses, and the like. Further, since rattling is small and friction is small therein, the structure of the seat slide device of the present invention can also be applied as a sliding member of a jig using a slide structure of a straight moving type or a suspension unit in an XY direction.

EXPLANATION OF REFERENCE SYMBOLS 1 vehicle seat
1A seat cushion part
1B seat back part
10 seat frame 20 cushion frame
30 back frame
151 first link
151a shaft member
152 second link
152a shaft member
153 third link
154 fourth link
160 lifter mechanism part
40 seat slide device
41 lower rail
42 upper rail
43 lock mechanism
431 attaching plate part
432 operating plate part
433 lock claw
434 lock release member
435 coupling shaft
435a operating part

The invention claimed is:

1. A seat slide device for a vehicle seat to adjust a position in a forward and backward direction of the vehicle seat, the seat slide device comprising:
a pair of lower rails attached to a floor of a vehicle at a predetermined interval in a width direction from each other, and a pair of upper rails, which are provided slidably on the lower rails, respectively; and
lock mechanisms configured to lock the upper rails with respect to the lower rails at an appropriate slide position,
wherein the lock mechanisms have an elastic lock member supported on the upper rails and are formed of an elastic member having lock claws engaging with engaged parts formed in the lower rails, and the elastic lock member is structured to become an elastic fulcrum such that elasticity of the elastic lock member operates on the lower rails and on the upper rails,
wherein the elastic lock member is formed of a steel spring and comprises:
an attaching plate part attached to vertical wall parts of the upper rails, and
an operating plate part, which is integrally formed with the attaching plate part, has an elastic force to be constantly biased in a direction to depart from the attaching plate part attached to the vertical wall parts, and has the lock claws projecting in a direction to depart from the vertical wall parts and engaging with plural engaged parts formed along a longitudinal direction in opposing parts in respective lower rails,
wherein the lock mechanisms further include a lock release member, which displaces the operating plate part in a direction of the vertical wall parts against the elastic force of the operating plate part, so as to release an engaging state of the lock claws and the engaged parts of the lower rails,
wherein respective upper wall parts of the lower rails have a shape such that downward oblique wall parts bend obliquely downward and toward a direction of side wall parts that extend from respective opposing edges, and the upper rails have upward oblique wall parts standing up obliquely from respective outer edge parts of horizontal wall parts toward the vertical wall parts, and the upward oblique wall parts are disposed outside respective downward oblique wall parts of the lower rails,
wherein the engaged parts of the lower rails are formed of holes or trenches formed in the downward oblique wall parts,
wherein auxiliary engaged parts constituted by holes or trenches are formed in respective upward oblique wall parts of the upper rails corresponding to formation positions of the lock claws, the auxiliary engaged parts retaining, at a time of locking, the lock claws stably by that the lock claws penetrate the engaged parts of respective lower rails and then engage with the auxiliary engaged parts,
wherein the upper rails include retaining members having inclining surfaces between the vertical wall parts and portions located on both sides of the vertical wall parts on the horizontal wall parts, and
wherein when a force operates in a direction to disengage the upper rails from the respective lower rails, the inclining surfaces of the retaining members abut the downward oblique wall parts of the respective lower rails, and suppress a deformation of the horizontal wall parts.

2. The seat slide device according to claim 1, wherein the elastic lock member is attached to a substantially center part in a longitudinal direction of the upper rails.

3. The seat slide device according to claim 1,
wherein in the elastic lock member, the operating plate part is bent downward from an upper part of the attaching plate part and has in a middle part an expanding part expanding in a direction to depart from the vertical wall parts of the upper rails, and the lock claws projecting in a direction to depart from the vertical wall parts are further formed on a lower edge, and
wherein the lock release member is configured to displace the expanding part of the operating plate part in a direction to the vertical wall parts, so as to release engagement of the lock claws.

4. The seat slide device according to claim 3, wherein a respective one end of a pair of lock release members sandwiching the vertical wall part of one of the upper rails and another respective one end of another pair of lock release members sandwiching the vertical wall part of the other one of the upper rails are coupled via a coupling shaft, and the two pairs of lock release members are configured to operate in synchronization by operating an operating part coupled to one end or to both ends of the coupling shaft.

5. The seat slide device according to claim 1,
wherein the elastic lock member and the lock release member are each provided symmetrically on both sides across the vertical wall parts of each of the upper rails,
wherein the plural engaged parts formed along a longitudinal direction of the lower rails are disposed at symmetrical positions of both sides with respect to a center line along the longitudinal direction of the lower rails, and
wherein at a time of locking, the lock claws on both sides across the vertical wall parts of each of the upper rails engage respectively with the engaged parts on both sides in the longitudinal direction of the lower rails.

6. The seat slide device according to claim 1, wherein in at least one end in a longitudinal direction of the lower rails where a fixing part with respect to the floor is located, reinforcing plate-shaped members with a predetermined thickness are A layered in at least one of opposing pairs of side wall parts and upper wall parts.

7. A seat slide device for a vehicle seat to adjust a position in a forward and backward direction of the vehicle seat, the seat slide device comprising:

a pair of lower rails attached to a floor of a vehicle at a predetermined interval in a width direction from each other, and a pair of upper rails, which are provided slidably on the lower rails, respectively; and lock mechanisms configured to lock the upper rails with respect to the lower rails at an appropriate slide position, wherein the lower rails and the upper rails are substantially symmetrical bilaterally with respect to a center in a cross-sectional shape orthogonal to a longitudinal direction, wherein the lock mechanisms are disposed on both sides of the upper rails and are configured to engage with the lower rails to lock the lower rails, wherein the lock mechanisms have an elastic lock member supported on the upper rails and are formed of an elastic member having lock claws engaging with engaged parts formed in the lower rails, and the elastic lock member is structured to become an elastic fulcrum such that elasticity of the elastic lock member operates on the lower rails and on the upper rails, wherein the lower rails are each substantially symmetrical bilaterally with a substantially C-shaped cross section, having a bottom wall part, a pair of side wall parts standing up from both sides of the bottom wall part and opposing each other, and a pair of upper wall parts both bent inward from upper edges of respective side wall parts with opposing edges separated from each other by a predetermined gap, and wherein the upper rails are each bilaterally symmetrical with a substantially T-shaped cross section, having horizontal wall parts located inside the lower rails, and a vertical wall part standing up substantially perpendicularly with respect to the horizontal wall parts, and projecting upward from a gap between the opposing edges of the pair of upper wall parts in the lower rails.

8. A seat slide device for a vehicle seat to adjust a position in a forward and backward direction of the vehicle seat, the seat slide device comprising:

a pair of lower rails attached to a floor of a vehicle at a predetermined interval in a width direction from each other, and a pair of upper rails, which are provided slidably on the lower rails, respectively; and lock mechanisms configured to lock the upper rails with respect to the lower rails at an appropriate slide position, wherein the lock mechanisms have an elastic lock member supported on the upper rails and are formed of an elastic member having lock claws engaging with engaged parts formed in the lower rails, and the elastic lock member is structured to become an elastic fulcrum such that elasticity of the elastic lock member operates on the lower rails and on the upper rails, wherein bottom wall parts of the lower rails have the stepped parts such that a part of the bottom wall parts protrudes upward, and on vertically long cross-sectional portions of the stepped parts, at least one roller disposed between the lower rails and the upper rails is supported, and wherein, in the lower rails, the bottom wall parts have a part having an R-shaped cross-section in a corner on both ends in a width direction, portions close to an inside of each part having the R-shaped cross-section are stepped parts protruding upward, and the at least one roller has a width corresponding to a space between the stepped parts.

9. The seat slide device according to claim 8, wherein the bottom wall parts of the lower rails are shaped such that a substantially center part in the width direction between the stepped parts expands upward.

10. The seat slide device according to claim 8, wherein the elastic lock member is formed of a steel spring with a thickness in a range of 0.6 mm to 1.2 mm.

\* \* \* \* \*